US012034204B2

(12) United States Patent
Kang et al.

(10) Patent No.: US 12,034,204 B2
(45) Date of Patent: Jul. 9, 2024

(54) ANTENNA FOR WEARABLE DEVICE

(71) Applicant: SAMSUNG ELECTRONICS CO., LTD., Suwon-si (KR)

(72) Inventors: Woo Suk Kang, Seoul (KR); Chae Up Yoo, Seoul (KR); In Young Lee, Hwaseong-si (KR); Jae Kwang Sim, Uiwang-si (KR); Jeong Ho Ahn, Suwon-si (KR); Jin Woo Jung, Seoul (KR); Se Woong Kim, Gimhae-si (KR); Jae Bong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/203,102

(22) Filed: May 30, 2023

(65) Prior Publication Data

US 2023/0299471 A1 Sep. 21, 2023

Related U.S. Application Data

(63) Continuation of application No. 17/134,832, filed on Dec. 28, 2020, now Pat. No. 11,688,931, which is a (Continued)

(30) Foreign Application Priority Data

Aug. 30, 2017 (KR) ........................ 10-2017-0110533

(51) Int. Cl.
*H01Q 1/27* (2006.01)
*G04G 21/02* (2010.01)
(Continued)

(52) U.S. Cl.
CPC ............. *H01Q 1/273* (2013.01); *G04G 21/02* (2013.01); *G04G 21/025* (2013.01); *G04G 21/04* (2013.01);
(Continued)

(58) Field of Classification Search
CPC ............ H01Q 1/273; H01Q 1/27; H01Q 1/24; H01Q 1/243; H01Q 9/42; H01Q 9/0464;
(Continued)

(56) References Cited

U.S. PATENT DOCUMENTS 9,172,148 B2 10/2015 Lyons et al.
9,257,740 B2 2/2016 Lyons et al.
(Continued)

FOREIGN PATENT DOCUMENTS

CN 105814747 A 7/2016
CN 106159415 A 11/2016
(Continued)

OTHER PUBLICATIONS

U.S. Appl. No. 17/134,832, filed Dec. 28, 2020; Kang et al.
(Continued)

*Primary Examiner* — Hai V Tran
(74) *Attorney, Agent, or Firm* — Nixon & Vanderhye P.C.

(57) ABSTRACT

A wearable device which is mountable on a wrist of a user includes a housing including a metal structure, a display positioned within the housing, wherein the display includes a metal layer positioned within the metal structure and spaced apart from the metal structure by a given gap, a printed circuit board (PCB) positioned within the housing and including a ground region, and a control circuit positioned on the PCB and configured to feed a first point of the metal structure. The metal layer is electrically connected with the ground region of the PCB at a second point spaced from the first point by a given angle.

20 Claims, 26 Drawing Sheets

Related U.S. Application Data continuation of application No. 16/117,179, filed on Aug. 30, 2018, now Pat. No. 10,879,597.

(51) Int. Cl.

| | |
|---|---|
| ***G04G 21/04*** | (2013.01) |
| ***G04R 60/06*** | (2013.01) |
| ***G04R 60/12*** | (2013.01) |
| ***H01Q 1/24*** | (2006.01) |
| ***H01Q 3/24*** | (2006.01) |
| ***H01Q 9/04*** | (2006.01) |
| ***H01Q 9/24*** | (2006.01) |
| ***H01Q 9/42*** | (2006.01) |
| *H01Q 5/378* | (2015.01) |
| *H01Q 7/00* | (2006.01) |

(52) U.S. Cl.

CPC ............. *G04R 60/06* (2013.01); *G04R 60/12* (2013.01); *H01Q 1/24* (2013.01); *H01Q 1/243* (2013.01); *H01Q 1/27* (2013.01); *H01Q 3/24* (2013.01); *H01Q 9/04* (2013.01); *H01Q 9/0464* (2013.01); *H01Q 9/42* (2013.01); *H01Q 5/378* (2015.01); *H01Q 7/00* (2013.01)

(58) Field of Classification Search

CPC ............ H01Q 9/04; H01Q 3/24; G04G 21/04; G04G 21/025; G04G 21/02; G04R 60/06; G04R 60/12

See application file for complete search history.

(56) References Cited

U.S. PATENT DOCUMENTS

| | | | | |
|---|---|---|---|---|
| 928,155 | A1 | 3/2016 | Tsai et al. | |
| 9,647,339 | B2 | 5/2017 | Lo et al. | |
| 9,853,377 | B2 | 12/2017 | Kim et al. | |
| 9,891,667 | B2 | 2/2018 | Jung et al. | |
| 9,979,426 | B2 | 5/2018 | Na et al. | |
| 10,333,211 | B2 | 6/2019 | Kim et al. | |
| 10,879,597 | B2 | 12/2020 | Kang et al. | |
| 2011/0013491 | A1* | 1/2011 | Fujisawa ................ | G04C 10/02 368/205 |
| 2014/0225786 | A1 | 8/2014 | Lyons et al. | |
| 2015/0048979 | A1* | 2/2015 | Asrani ..................... | H01Q 5/50 343/702 |
| 2015/0255855 | A1 | 9/2015 | Tsai et al. | |
| 2016/0013544 | A1 | 1/2016 | Lyons et al. | |
| 2016/0056533 | A1 | 2/2016 | Nissinen | |
| 2016/0156094 | A1* | 6/2016 | Lo ............................ | H01Q 7/00 343/702 |
| 2016/0218419 | A1 | 7/2016 | Vance | |
| 2016/0064804 | A1 | 8/2016 | Kim et al. | |
| 2016/0254587 | A1 | 9/2016 | Jung et al. | |
| 2016/0255733 | A1 | 9/2016 | Jung et al. | |
| 2016/0294038 | A1* | 10/2016 | Lo ............................ | H01Q 1/48 |
| 2016/0294086 | A1 | 10/2016 | Kim | |
| 2017/0048991 | A1 | 2/2017 | Kim et al. | |
| 2017/0214422 | A1* | 7/2017 | Na ........................... | H01Q 7/00 |
| 2018/0062249 | A1* | 3/2018 | Sung ...................... | H01Q 1/273 |
| 2018/0069300 | A1 | 3/2018 | Choi | |
| 2018/0129170 | A1* | 5/2018 | Yun ........................ | H01Q 1/273 |
| 2019/0067795 | A1 | 2/2019 | Shin | |
| 2019/0109367 | A1* | 4/2019 | Tseng ..................... | H01Q 1/241 |
| 2019/0210703 | A1 | 7/2019 | Sepanniitty | |

FOREIGN PATENT DOCUMENTS

| | | | |
|---|---|---|---|
| CN | 205863383 | U | 1/2017 |
| CN | 106921030 | A | 7/2017 |
| EP | 3 319 170 | A1 | 5/2018 |
| JP | 2017-085397 | | 5/2017 |
| KR | 10-2017-0089668 | | 8/2017 |
| KR | 10-2018-0050151 | | 5/2018 |

OTHER PUBLICATIONS

U.S. Appl. No. 16/117,179, filed Aug. 30, 2018; Kang et al.
Search Report and Written Opinion dated Oct. 31, 2018 in counterpart International Patent Application No. PCT/KR2018/010036.
Extended European Search Report dated Jun. 23, 2020 for European Application No. 18850382.5.
Chinese Office Action dated Oct. 12, 2020 for CN Application No. 201880056077.7
Chinese Notice of Allowance dated Jul. 5, 2021 for CN Application No. 201880056077.7.
India Hearing Notice dated Dec. 23, 2023 for IN Application No. 202017013143.
Extended European Search Report dated Apr. 26, 2024 for EP Application No. 24152480.0.

* cited by examiner

ANTENNA FOR WEARABLE DEVICE

CROSS-REFERENCE TO RELATED APPLICATION

This application is a Continuation of U.S. application Ser. No. 17/134,832, filed Dec. 28, 2020, which is a Continuation of U.S. application Ser. No. 16/117,179, filed Aug. 30, 2018 (now U.S. Pat. No. 10,879,597), which claims priority to Korean Application No. KR 10-2017-0110533, filed Aug. 30, 2017, the entire contents of which are all hereby incorporated herein by reference in their entireties.

BACKGROUND

Field

The present disclosure relates to an antenna for a wearable device.

Description of Related Art

A wearable electronic device is widely being supplied following user devices such as a smartphone and a tablet. Such wearable electronic devices include antenna for wireless communication therein.

In general, a wearable electronic device which is currently being supplied includes an antenna for supporting a global navigation satellite system (GLASS). For example, the wearable electronic device may include a global positioning system (GPS) antenna. In addition, a Bluetooth antenna for communication with a mother device such as a smartphone and a cellular network antenna for supporting 3rd generation (3G) or long term evolution (LTE) communication may be further included in the wearable electronic device.

For example, in the case of a conventional smart watch, the GPS antenna may be implemented through a metal structure of a monopole shape, which is mounted within a strap connected with the smart watch, or may be implemented by inserting a patch antenna into the smart watch. In addition, the GPS antenna may be implemented through indirect feeding (e.g., coupling feeding), with a metal structure positioned on a front surface of the smart watch.

The above information is presented as background information only to assist with an understanding of the present disclosure. No determination has been made, and no assertion is made, as to whether any of the above might be applicable as prior art with regard to the present disclosure.

Since an internal space of a wrist-mounted electronic device such as a smart watch is narrow, it is difficult to mount a plurality of antennas. In particular, even though an antenna is mounted, it may be difficult to secure sufficient performance. The above-described issue occurs in various wearable devices, the mounting space of which is insufficient, such as an ankle-mounted electronic device, a chest-mounted electronic device, a neck-mounted electronic device, and a head (face)-mounted electronic device.

Among existing ways to implement an antenna, in the case of a monopole antenna mounted within a strap, radiation performance may be greatly reduced by a human body, with the strap mounted on a wrist. In the case of the patch antenna, the efficiency and directivity of the antenna is excellent, however, since the antenna occupies much space, it is difficult to apply the antenna to a recent smart watch on which various functions or sensors are mounted. In the case of the antenna using the coupling feeding, since a structure for coupling should be implemented within a limited space, it is difficult to miniaturize the antenna and improve the efficiency.

SUMMARY

Aspects of the present disclosure address at least the above-mentioned problems and/or disadvantages and provide at least the advantages described below. Accordingly, an aspect of the present disclosure is to provide an antenna of an electronic device for addressing the above-described problem and problems brought up in this disclosure.

In accordance with an aspect of the present disclosure, a wearable device which is mountable on a wrist of a user may include a housing including a metal structure, a display positioned within the housing, wherein the display includes a metal layer positioned within the metal structure and spaced apart from the metal structure by a gap, a printed circuit board (PCB) positioned within the housing and including a ground region, and a control circuit positioned on the PCB and configured to feed a first point of the metal structure. The metal layer may be electrically connected with the ground region of the PCB at a second point spaced from the first point by a given angle.

According to various embodiments of the present disclosure, an antenna having high efficiency and directivity may be implemented using a metal structure of a display and a metal housing in a wearable electronic device.

Also, the user experience may be improved by changing a radiation pattern of an antenna depending on various operating conditions.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
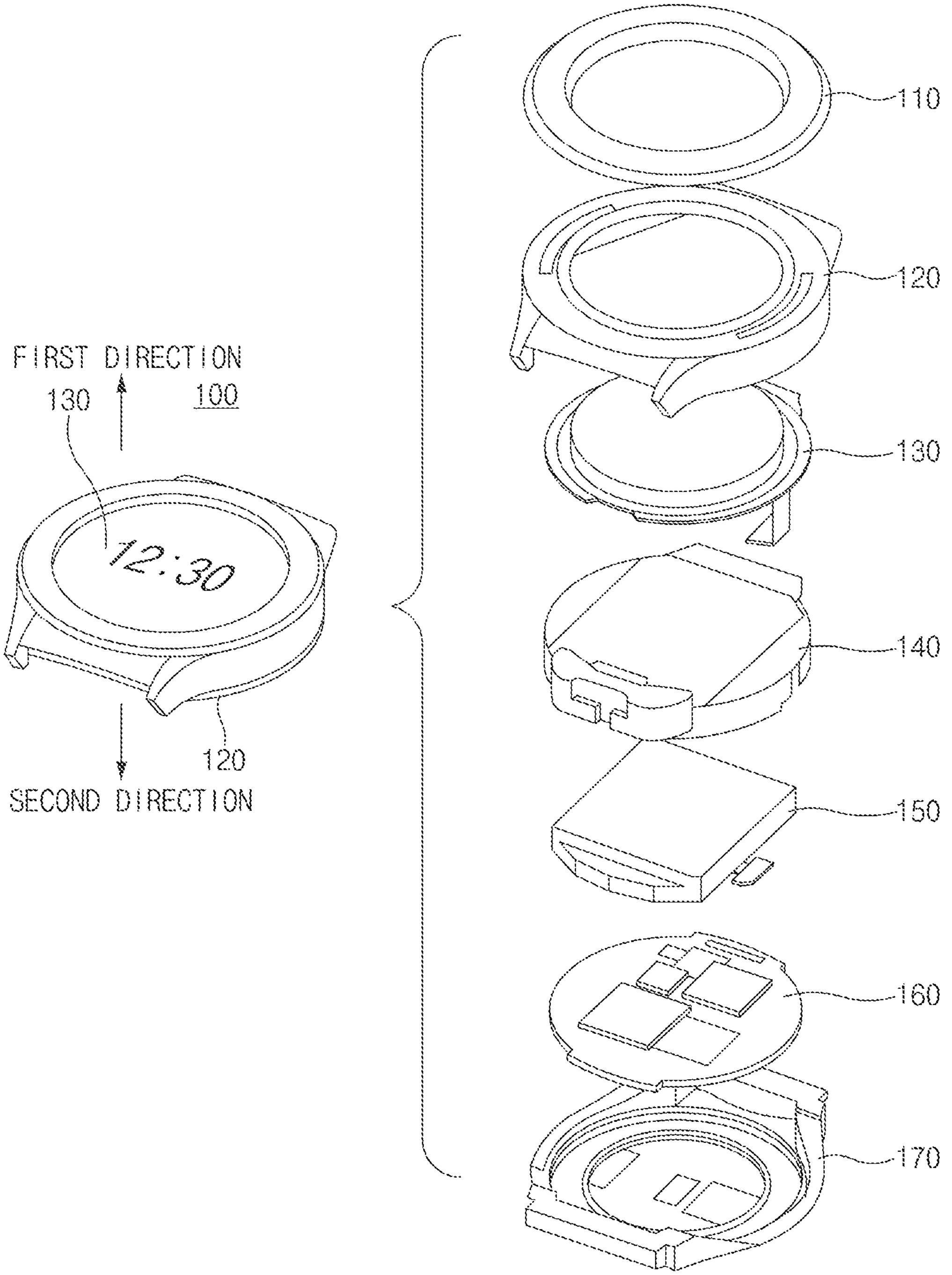
FIG. 1 is an exploded perspective view of a wrist-mounted electronic device according to an embodiment.

Hereinafter, various example embodiments of the present disclosure may be described with reference to accompanying drawings. Accordingly, those of ordinary skill in the art will recognize that modifications, equivalents, and/or alternatives of the various example embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. On the other hand, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must refer only to "specifically designed to" in hardware. Instead, the expression "a device configured to" may refer to a situation in which the device is "capable of" operating together with another device or other parts. For example, a "processor configured to (or set to) perform A, B, and C" may refer, for example, and without limitation, to a dedicated processor (e.g., an embedded processor) for performing a corresponding operation, a generic-purpose processor e.g., a central processing unit (CPU) or an application processor) which performs corresponding operations by executing one or more software programs which are stored in a memory device, or the like.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 is an exploded perspective view of a wrist-mounted electronic device according to an example embodiment. In FIG. 1, a wrist-mounted electronic device may be understood as a smart watch. In the present disclosure, the term "wrist-mounted electronic device" or "smart watch" may be simply referred to as a "wearable device".

Referring to FIG. 1, a wearable device 100 may include a housing 120, a display 130, a bracket 140, a battery 150, a printed circuit board (PCB) 160, and a rear cover 170.

The housing 120 may protect various components (e.g., the display 130, the battery 150, the PCB 160, and the like) positioned within the wearable device 100. A component corresponding to the housing 120 may be illustrated in FIG. 1, but the housing 120 may be understood as the concept including all components constituting a case of the wearable device 100. In an embodiment, the housing 120 may include a bezel wheel 110 positioned around a through hole through which the display 130 is exposed. In addition, the housing 120 may be understood as the concept including a cover glass positioned above the display 130, the rear cover 170, and the like.

According to an embodiment, at least a portion of the housing 120 may be implemented with a conductive material such as metal. For example, a partial region, which forms a front surface of the wearable device 100, of the housing 120 may be implemented with a metal structure of a ring shape. The metal structure may be electrically connected with a control circuit (e.g., a processor including various processing circuitry such as, for example, and without limitation, an application processor (AP), a communication processor (CP), or the like) positioned on the PCB 160, and the control circuit may feed the metal structure to allow the metal structure to operate as an antenna radiator. In an embodiment, the bezel wheel 110 may be implemented with metal and may correspond to the above-described metal structure. In another embodiment, a partial region, which forms a front surface and/or a side surface of the wearable device 100, of the housing 120 may be implemented with the metal structure. In the present disclosure, for convenience of description, it is assumed that the partial region of the housing 120 forming the front surface of the wearable device 100 has the metal structure of a ring shape.

In an embodiment, the bezel wheel 110 may prevent and/or reduce a black matrix (BM) region of the display 130 from being exposed to the outside, and a user may generate a user input by rotating the bezel wheel 110.

In an embodiment, the display 130 may have a disk shape of a specific thickness overall and may output an image, a text, or the like. For another example, at least a portion of the display 130 may be exposed to the outside through a first surface of the housing 120, which faces in a first direction. In an embodiment, the display 130 may include a touch panel. For example, the display 130 may have a multi-layer structure including a display panel, a touch panel, a polarizing plate, a shield layer, and the like.

In an embodiment, the shield layer of the display 130 may be implemented with a metal material. For example, to minimize and/or reduce a noise which occurs in the display 130 and has an influence on various components positioned on the PCB 160, a copper (Cu) sheet may be positioned on a rear surface of the display 130. The shield layer of the metal material may be utilized to improve performance of an antenna. In the present disclosure, the shield layer of the metal material may be simply referred to as a "metal layer".

In an embodiment, the display 130 may be electrically connected with the PCB 160 through a signal line for transmitting/receiving data. Also, the display 130 may be connected with a ground of the PCB 160 through the signal line or through a separate electrical path.

In an embodiment, the bracket 140 may be used to mount and support internal components such as the display 130, the battery 150, and the PCB 160. The bracket 140 may be implemented with a non-conductive material (e.g., plastic).

In an embodiment, the battery 150 may be mounted on the bracket 140 and may be electrically connected with the PCB 160. The battery 150 may be charged by an external power and may output the charged power to supply a power for an operation of the wearable device 100.

In an embodiment, the PCB 160 may include a module, a chip, and the like necessary for driving the wearable device 100. For example, the PCB 160 may include a processor, a memory, a communication circuit, and the like.

In an embodiment, the PCB 160 may include a plurality of layers, and one of the plurality of layers may function as a ground of an antenna.

In an embodiment, the rear cover 170 may be coupled with the housing 120 to fix and protect internal components. The rear cover 170 may be formed of a nonmetal material or a non-conductive material.

Figure 2:
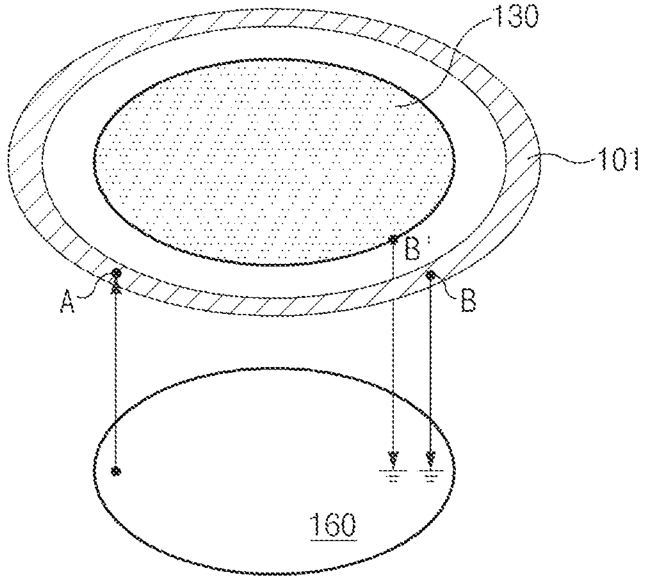
FIG. 2 is a diagram illustrating a metal structure, feeding position and a ground associated with a display, according to an embodiment.

FIG. 2 is a diagram illustrating a metal structure, a feeding position and a ground associated with a display, according to an embodiment. FIG. 2 illustrates a part, which is associated with an operation of an antenna, of a configuration of the wearable device 100. Also, in the present disclosure including FIG. 2, it is assumed that the display 130 and a metal structure 101 are in the form of a closed circle. However, various embodiments of the present disclosure may be applied to the case where a shape of a wearable device may, for example, and without limitation, be a rectangle, an ellipse, or any other shape.

Referring to FIG. 2, a power may be supplied from the PCB 160 to a first point "A" of the metal structure 101. For example, the control circuit positioned on the PCB 160 may directly feed the metal structure 101 through a conductive connection member such as a C-clip.

The PCB 160 may be connected with a second point B' of the display 130 through a cable for the purpose of providing an image signal to the display 130. The metal layer included in the display 130 may be grounded by the cable. For example, a ground line included in the cable may electrically connect a ground region (or a ground layer) provided in the PCB 160 and the metal layer of the display 130. However, in an embodiment, the cable may be understood as the concept including a flexible PCB (FPCB), or may be replaced with the FPCB.

The metal structure 101 may be connected with the ground region of the PCB 160 at a third point "B". In an embodiment, the metal structure 101 may be selectively connected with the ground region of the PCB 160 at a plurality of points. For example, the metal structure 101 may include a plurality of switches which electrically connect the ground region of the PCB 160 with the metal structure 101. In an embodiment, the control circuit may close or open the plurality of switches to allow the metal structure 101 to be connected with the ground region of the PCB 160 at one or more points. In other embodiment, the control circuit may open the plurality of switches to allow the metal structure 101 not to be connected with the ground region of the PCB 160.

The second point B' may be spaced from the first point "A" by a given angle. For example, the second point B' may form an angle of 90 degrees with the first point "A" with respect to the center of the display 130. In this regard, a description will be given with reference to FIG. 3.

Figure 3A:
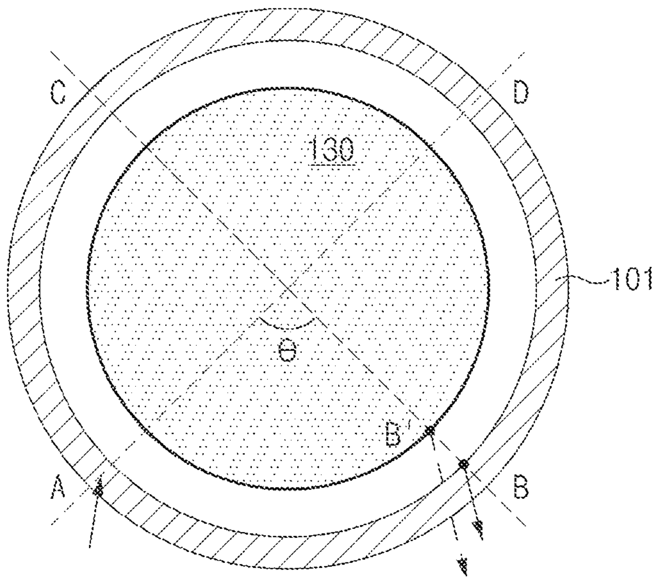
FIG. 3A is a diagram illustrating a feeding position of a metal structure and a ground position of a display, according to an embodiment.

FIG. 3A is a diagram illustrating a feeding position of a metal structure and a ground position of a display, according to an embodiment.

Referring to FIG. 3A, feeding may be made at the "A" point of the metal structure 101. At any stationary time, a potential of the "A" point at which the feeding is made may have the highest value in the metal structure 101, and a potential of a "D" point which is opposite to (or faces) the "A" point may have the lowest value in the metal structure 101. For example, the "A" point may have any (+) potential value, and the "D" point may have any (−) potential value. That is, (+) charges may be induced around the "A" point, and (−) charges may be induced around the "D" point.

As charges are induced in the metal structure 101, opposite charges may also be induced at the metal layer of the display 130. That is, (−) charges may be induced at a region adjacent to the "A" point, and (+) charges may be induced at a region adjacent to the "B" point.

As center points between the "A" point and the "D" point, the "B" and "C" points correspond to a point where a potential is theoretically a zero. Accordingly, a region adjacent to the "B" point, for example, a surrounding region of the B' point of the display 130 may have a potential value which approximates to substantially a zero.

Accordingly, the influence on a current induced at the display 130 (e.g., the metal layer) may be minimized and/or reduced in the case where the B' point is electrically connected with the ground region of the PCB 160 (e.g., through a cable). In other words, as the metal structure 101 is fed, a current may be induced indirectly (e.g., through coupling feeding) even at the metal layer of the display 130 adjacent to the metal structure 101. A cable may be connected to a surrounding region of the B' point for the purpose of minimizing and/or reducing hindrance to the flow of the current induced at the metal layer. For example, a cable may be connected with the ground region of the PCB 160 at a position corresponding to the B' point forming a given angle "0" (e.g., 90 degrees) with the "A" point with respect to the center of the display 130.

Figure 3B:
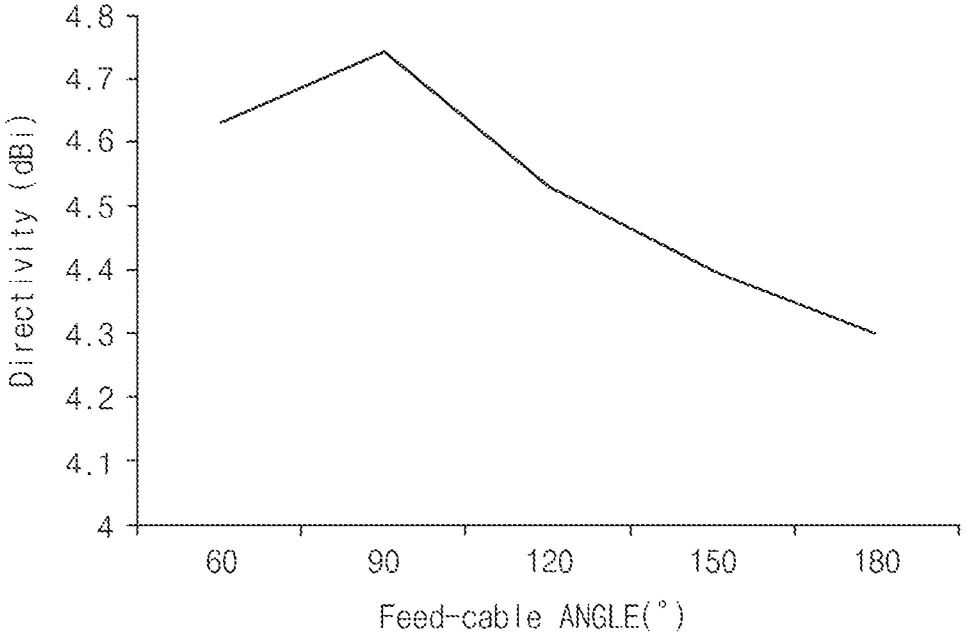
FIG. 3B is a graph illustrating an antenna gain varying with an angle between a feeding point and a cable-connected point, according to an embodiment.

FIG. 3B is a graph illustrating an antenna gain varying with an angle between a feeding point and a cable-connected point, according to an embodiment. FIG. 3B illustrates a gain, which is associated with a first direction, that is, a direction perpendicular to a plane of the display 130, of a gain of an antenna using the metal structure 101.

It may be understood from FIG. 3B that a gain of an antenna is maximal in the case where a feeding point and a cable-connected point make an angle of approximately 90 degrees. Also, it may be understood that a radiation gain of the first direction decreases as an angle which the feeding point and the cable-connected point make becomes closer to 180 degrees. Accordingly, a cable which connects the display 130 and the PCB 160 may be positioned within an appropriate range (e.g., a range from 90 degrees to ±30 degrees) in consideration of locations of components positioned within the wearable device 100, interference with another antenna, and a radiation gain of an antenna.

Figure 4A:
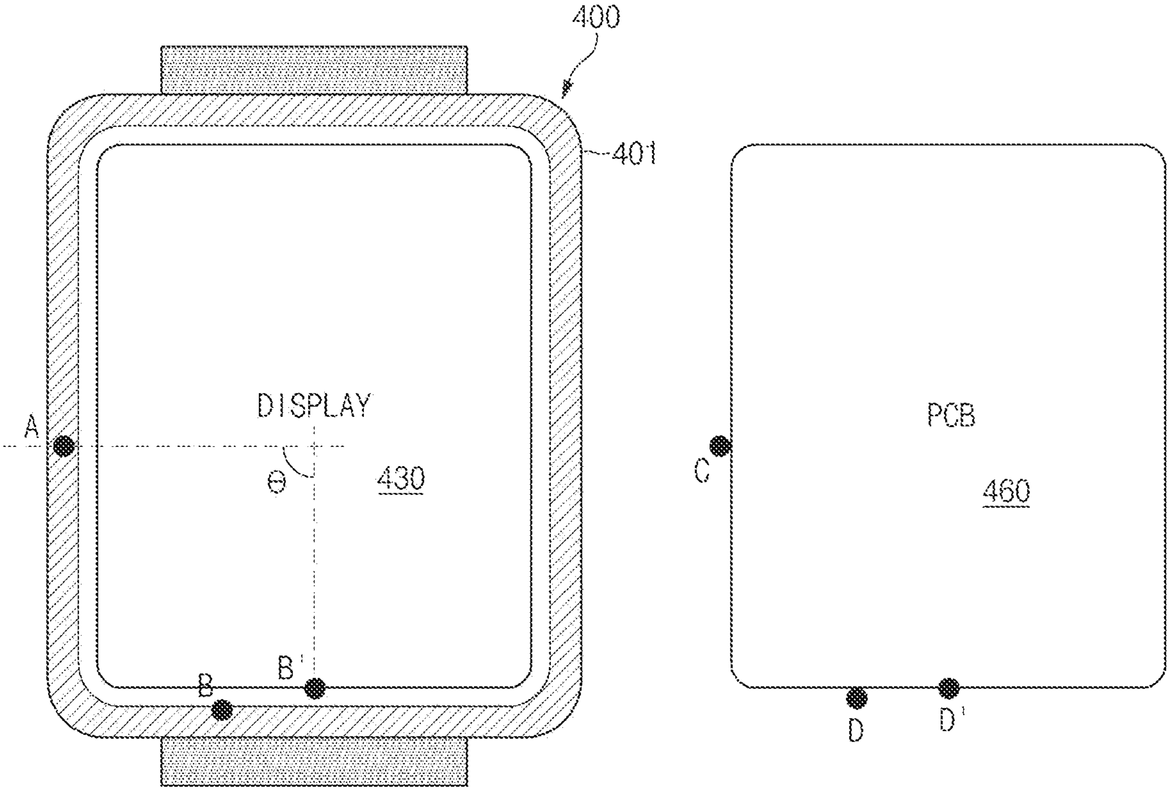
FIG. 4A is a diagram illustrating a feeding position of a metal structure and a ground position of a display, according to another embodiment.

FIG. 4A is a diagram illustrating a feeding position of a metal structure and a ground position of a display, according to another embodiment.

Referring to FIG. 4A, unlike the device described with reference to FIGS. 1 to 3, a wearable device 400 according to another embodiment may have a rectangular display structure having a rounded corner instead of a ring-shaped display structure. As such, unlike the metal structure 101, a metal structure 401 may also have a rectangular shape having a rounded corner, not a circle.

As in the description given with reference to FIG. 3A, feeding may be made at an "A" point in the vicinity of the left center of the metal structure 401. For convenience of description, a PCB 460 included in the wearable device 400 is separately illustrated on the right of drawing. A power may be supplied to the point "A" of the metal structure 401 through a point "C" of the PCB 460. In the case where the points "A" and "C" are connected, a point B' in the vicinity of the center bottom may correspond to a point where a potential is theoretically a zero. Although not illustrated in FIG. 4A, a point in the vicinity of the center top, which corresponds to the point B', may correspond to a point where a potential is theoretically a zero. The display 130 may be electrically connected with a ground plane of the PCB 460 at the point B'. In the case where the point B' is connected with a point ID', also, the metal structure 401 may be connected with the ground plane of the PCB 460 at a point "B" adjacent to the point B'. In the case where the point "B" and the point "D" are connected, when viewed from above a display 430, a first imaginary line which extends from the center of the display 430 to the point "A" may be substantially at right angles to a second imaginary line which extends from the center to the point B'.

Figure 4B:
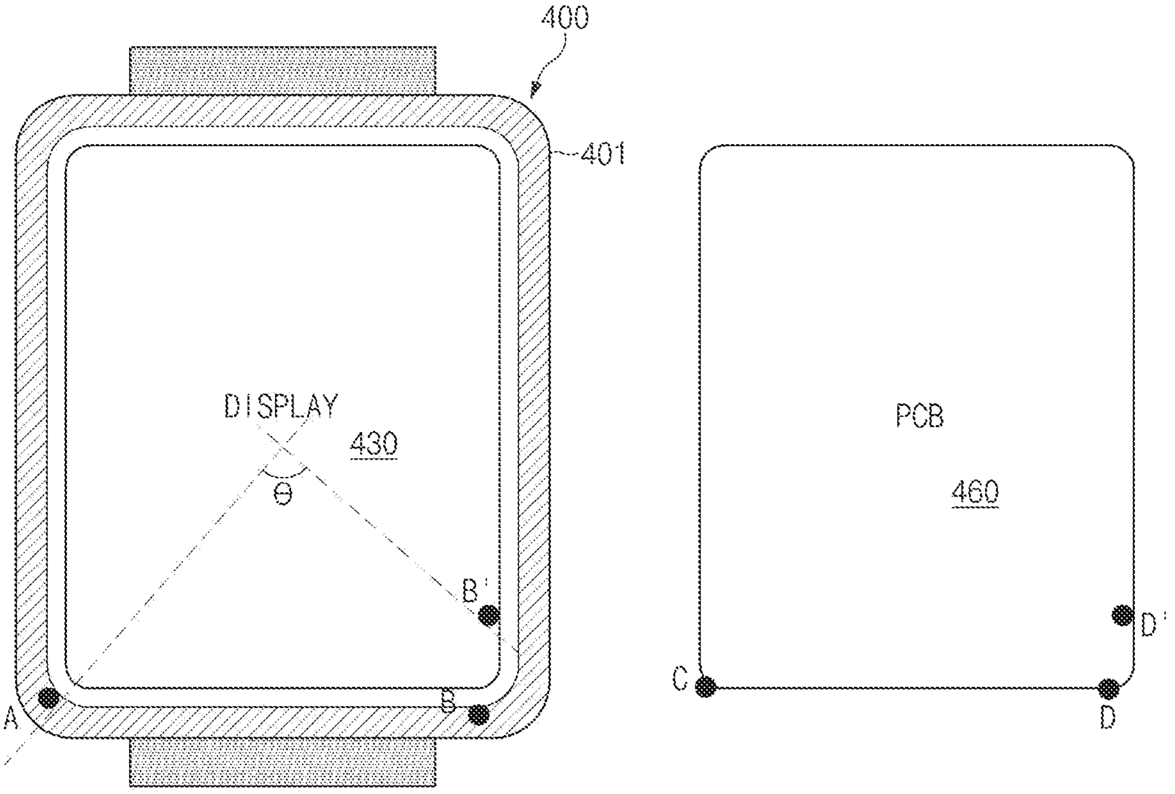
FIG. 4B is a diagram illustrating a feeding position of a metal structure and a ground position of a display, according to another embodiment.

FIG. 4B is a diagram illustrating a feeding position of a metal structure and a ground position of a display, according to another embodiment.

In the case of FIG. 4B, a point "A" at which the metal structure 401 is fed is positioned on the left bottom. In this case, a theoretical ground point of the display 430 may correspond to a point B' of the right bottom, and the display 430 may be connected with the ground plane of the PCB 460 at the point B'. A theoretical description is the same as that given with reference to FIGS. 3A and 4A, and thus, additional description will not be repeated here to avoid redundancy. As such, one point of a display may be connected with a ground region at an appropriate position with regard to various shapes of a display and a metal frame.

Figure 5:
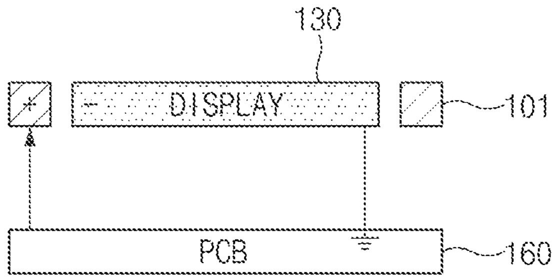
FIG. 5 is a diagram illustrating how to feed a metal structure and how to connect a cable to a display, according to an embodiment.

FIG. 5 is a diagram illustrating how to feed a metal structure and how to connect a cable to a display, according to an embodiment.

Referring to FIG. 5, the PCB 160 may feed one point (e.g., a first point) of the metal structure 101. In an embodiment, the metal structure 101 may be connected with the ground region of the PCB 160 at a plurality of points directly or through a switch structure.

The display 130 may be electrically connected with the ground region of the PCB 160 at one point (e.g., a second point). In this case, the display 130 may not be connected with the ground region at any other point, for example, except for the second point. Here, the second point may correspond to a point forming an appropriate angle with the first point as described with reference to FIGS. 3A, 3B, 4A and 4B.

In the case where one side of the display 130 is grounded, as illustrated in FIG. 5, a charge having a first polarity (e.g., a (+) polarity) may be induced at the metal structure 101 by feeding, and a charge having a second polarity (e.g., a (−) polarity) may be induced at the display 130 by the charge having the first polarity. As a result, the metal structure 101 and the display 130 may operate to be similar to a slot antenna (e.g., a slot mode may be formed), thereby making it possible to increase radiation efficiency of an antenna.

In the case where the display 130 is electrically connected with the ground region of the PCB 160 at two or more points, for example, in the case where the display 130 is electrically connected with the ground region of the PCB 160 even at a point which is illustrated in FIG. 5 as a negative charge is induced, a charge (e.g., having an opposite polarity to) corresponding to the charge induced at the metal structure 101 may be hindered from being induced at the display 130. This makes it difficult to form the slot mode between the metal structure 101 and the display 130. In this case, radiation efficiency may decrease. In this regard, a graph illustrating radiation efficiency is provided in FIG. 6.

Figure 6:
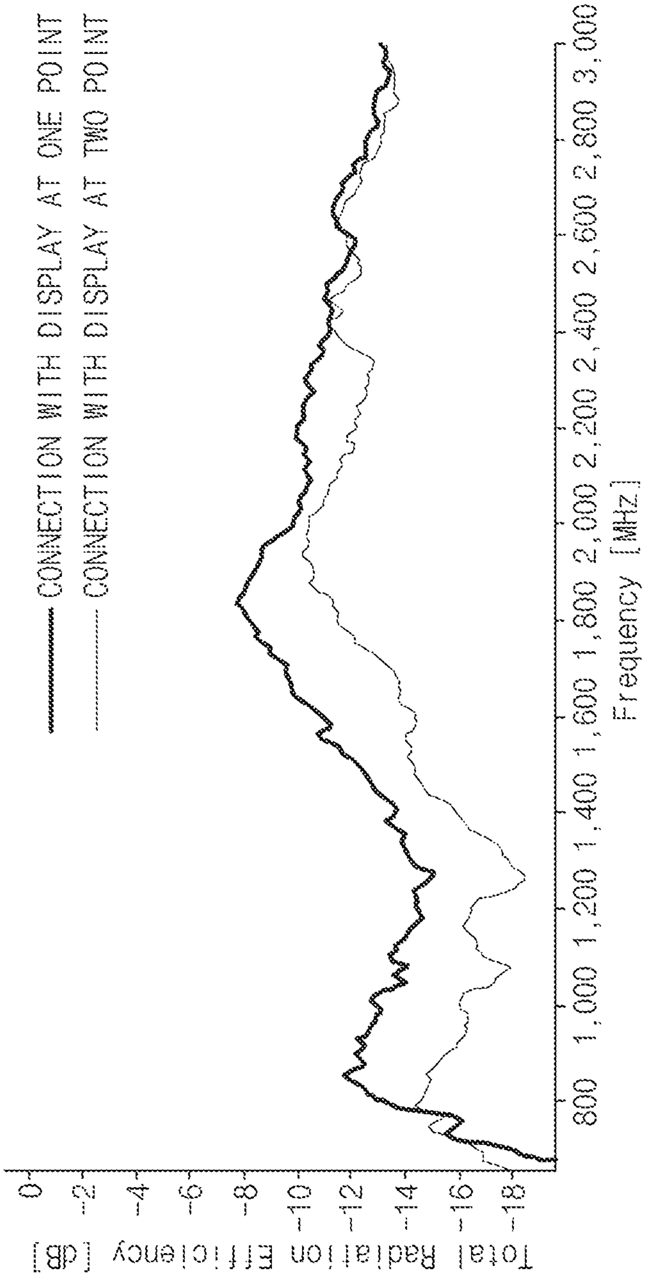
FIG. 6 is a graph illustrating radiation efficiency for each frequency, which is determined depending on the number of points where a display and a ground region are electrically connected, according to an embodiment.

FIG. 6 is a graph illustrating radiation efficiency for each frequency, which is determined depending on the number of points where a display and a ground region are electrically connected, according to an embodiment.

In FIG. 6, a bold solid line represents radiation efficiency for each frequency in the case where one point of the display 130 is grounded, and a thin solid line represents radiation efficiency for each frequency in the case where two points of the display 130 are grounded. It may be observed that the wearable device 100 has higher radiation efficiency in the case where one point is grounded, in a range from 800 MHz to 2.4 MHz, which is mainly used in a cellular network, a Wi-Fi network, and a GPS network.

Figure 7A:
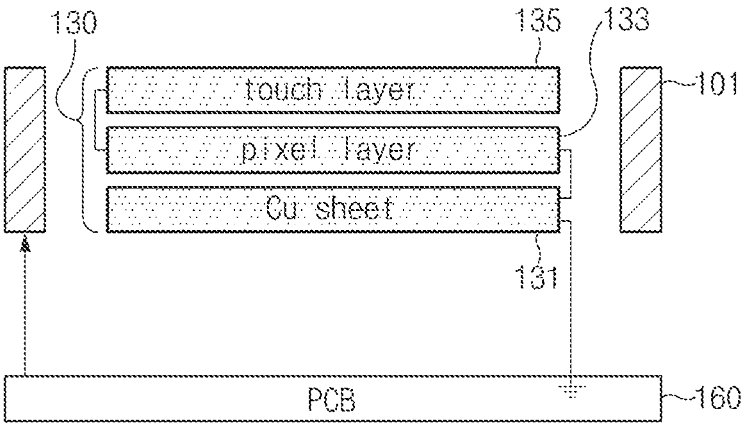
FIG. 7A is a diagram illustrating a method for connecting a pixel layer and a touch layer with a cable, according to an embodiment.
Figure 7B:
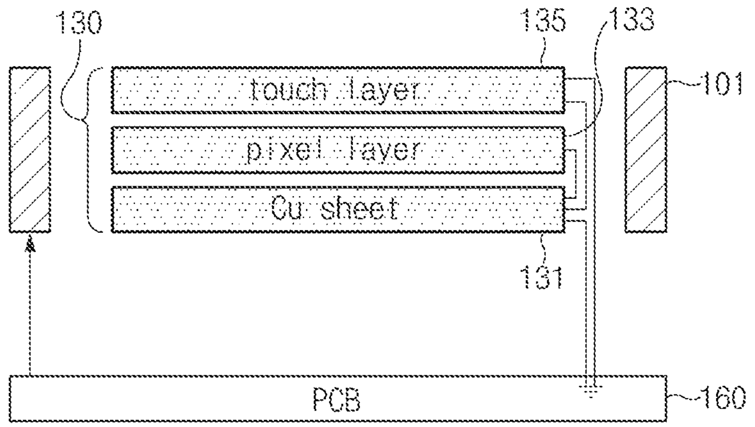
FIG. 7B a diagram illustrating a method for connecting a pixel layer and a touch layer with a cable, according to another embodiment.

FIGS. 7A and 7B are diagrams illustrating examples of cable connection according to a detailed structure of the display 130. For example, FIG. 7A illustrates a method for connecting a pixel layer and a touch layer with a cable, according to an embodiment. FIG. 7B illustrates a method for connecting a pixel layer and a touch layer with a cable, according to another embodiment.

Referring to FIG. 7A, the display 130 may include a copper sheet 131, a pixel layer 133, and a touch layer 135. The copper sheet 131 may correspond to the above-described metal layer. The pixel layer 133 may refer, for example, to a layer in which red, green, and blue (RGB) pixels for color expression are arranged. For example, the pixel layer 133 may be understood as a layer in which pixels such as, for example, and without limitation, LED pixels, OLED pixels, LCD pixels, or the like, are arranged. The touch layer 135 may refer, for example, to a layer in which a circuit for sensing a touch input of a user is positioned.

In addition to the layers illustrated in FIG. 7A, various layers such as a polarizing plate, an adhesive layer, a pressure sensor, and the like may be included in the display 130. Also, the touch layer 135 may be integrally implemented with the pixel layer 133. For example, embodiments of the present disclosure may be applied to an on-cell type or in-cell type display.

Referring to FIG. 7A, one point of the copper sheet 131 may be connected with the ground region of the PCB 160. Also, the pixel layer 133 may be connected with the copper sheet 131 so as to be grounded. The touch layer 135 may also be connected with the copper sheet 131 through the pixel layer 133 so as to be grounded.

A cable may include signal lines for operating a display (or a pixel) and a touch function, in addition to a ground line. That is, in the embodiment of FIG. 7A, the cable starting from the PCB 160 may be electrically connected with the copper sheet 131 and the pixel layer 133 at one point of the display 130. In FIG. 7A, the copper sheet 131 may be an example, and it may be understood that the copper sheet 131 is replaced with an appropriate conductive layer. Below, for convenience of description, a description will be given as a conductive layer is the copper sheet 131. A cable for the driving and ground of the touch layer 135 may be connected with the touch layer 135 at one point of the pixel layer 133. That is, a ground of the copper sheet 131 may be maintained at one point while a ground and a signal are provided to both the pixel layer 133 and the touch layer 135.

In the example of FIG. 7B, a plurality of cables extended from the PCB 160 may be connected with the display 130. For example, a first cable may connect the PCB 160 and the copper sheet 131, and a second cable may connect the PCB 160 and the touch layer 135. The display 130 may have an internal wiring structure connecting the copper sheet 131, the pixel layer 133, and the touch layer 135. The wiring and cable structures may be variously changed and implemented under the condition that only one point of the copper sheet 131 is connected with the ground region of the PCB 160. For example, a first cable may connect the PCB 160 and the pixel layer 133, and a second cable may connect the PCB 160 and the touch layer 135.

The examples illustrated in FIGS. 7A and 7B indicate that a cable toward the display 130 from the PCB 160 is integrally implemented. Compared to a conventional structure in which a cable for control of the display 130 (e.g., the pixel layer 133) and a cable for control of a touch screen ground the display 130 at different points, since one point of the display 130 is grounded, radiation efficiency may be improved in various embodiments.

Figure 8:
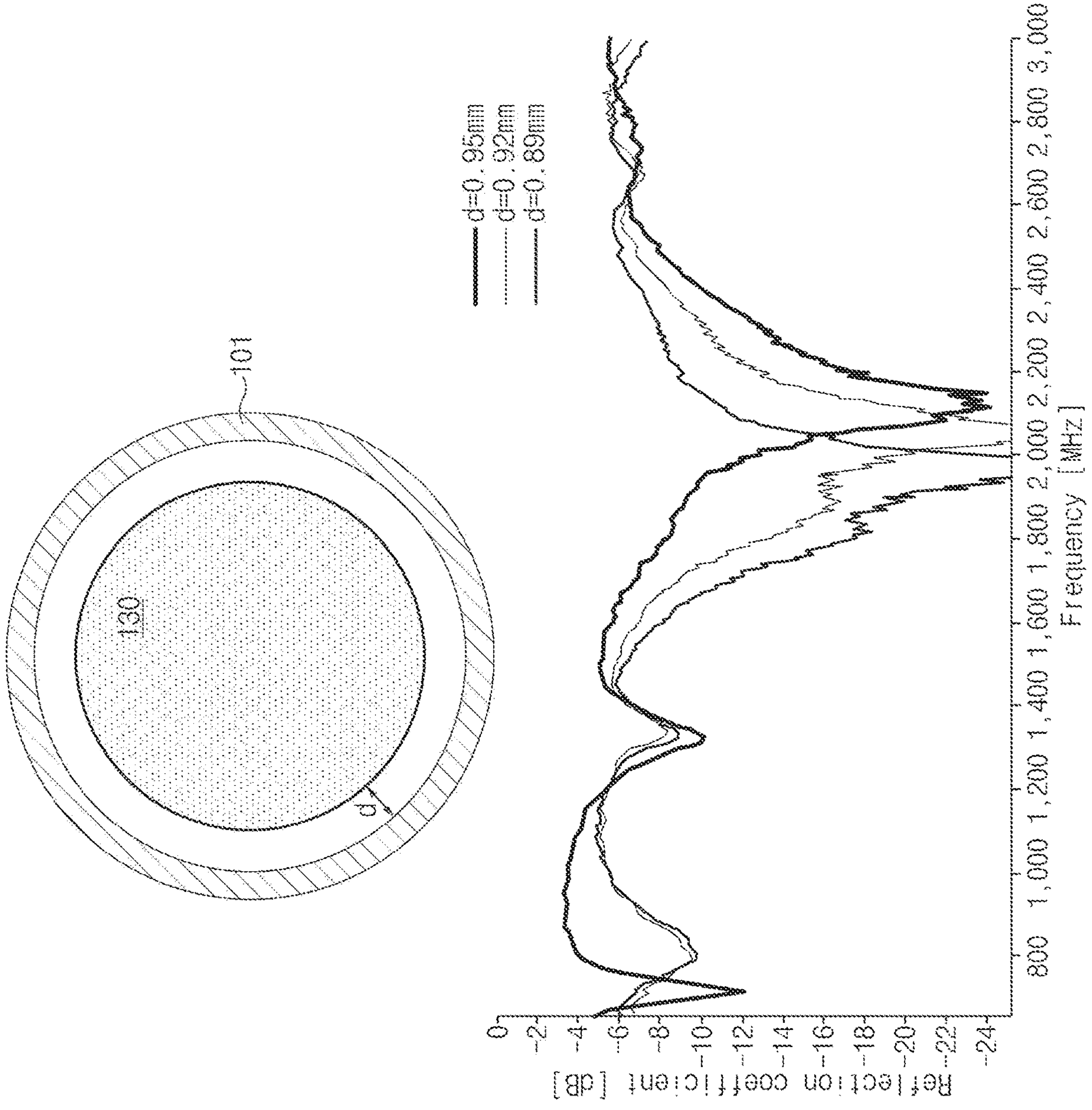
FIG. 8 is a graph illustrating a resonant frequency varying with a gap between a display and a metal structure, according to an embodiment.

FIG. 8 is a diagram including a graph illustrating a resonant frequency varying with a gap between a display and a metal structure, according to an embodiment. In FIG. 8, the display 130 may be understood as a metal layer, for example, the copper sheet 131. An antenna structure illustrated in FIG. 8 may be understood as an antenna of FIGS. 2, 3, 5, 7A, and/or 7B when viewed from above.

In an embodiment, the display 130 may include a metal layer, and the metal layer may be positioned within the metal structure 101 and may be spaced from the metal structure 101 by a given gap "d". The display 130 and the metal structure 101 of a wearable device are illustrated in FIG. 8 as being circular, but embodiments may be modified or changed by one of ordinary skill in the art such that the display 130 and the metal structure 101 may, for example, and without limitation, be implemented in the form of an ellipse, rectangle, or the like.

For example, a graph of FIG. 8 illustrates radiation efficiency in the case where the gap "d" has a default value of 0.95 mm. For example, in the case where "d" is 0.95 mm, the wearable device 100 may form resonance at approximately 2.15 GHz. In the case where "d" is smaller by 0.3 mm than the default value (e.g., in the case where "d" is 0.92 mm), a resonant frequency may be shifted to approximately 2.05 In the case where "d" is smaller by 0.6 mm than the default value (e.g., in the case where "d" is 0.89 mm), a resonant frequency may be shifted to approximately 1.96 GHz. Accordingly, a resonant frequency may be finely adjusted by adjusting the size of a gap between the display 130 and the metal structure 101 of the wearable device 100.

Figure 9:
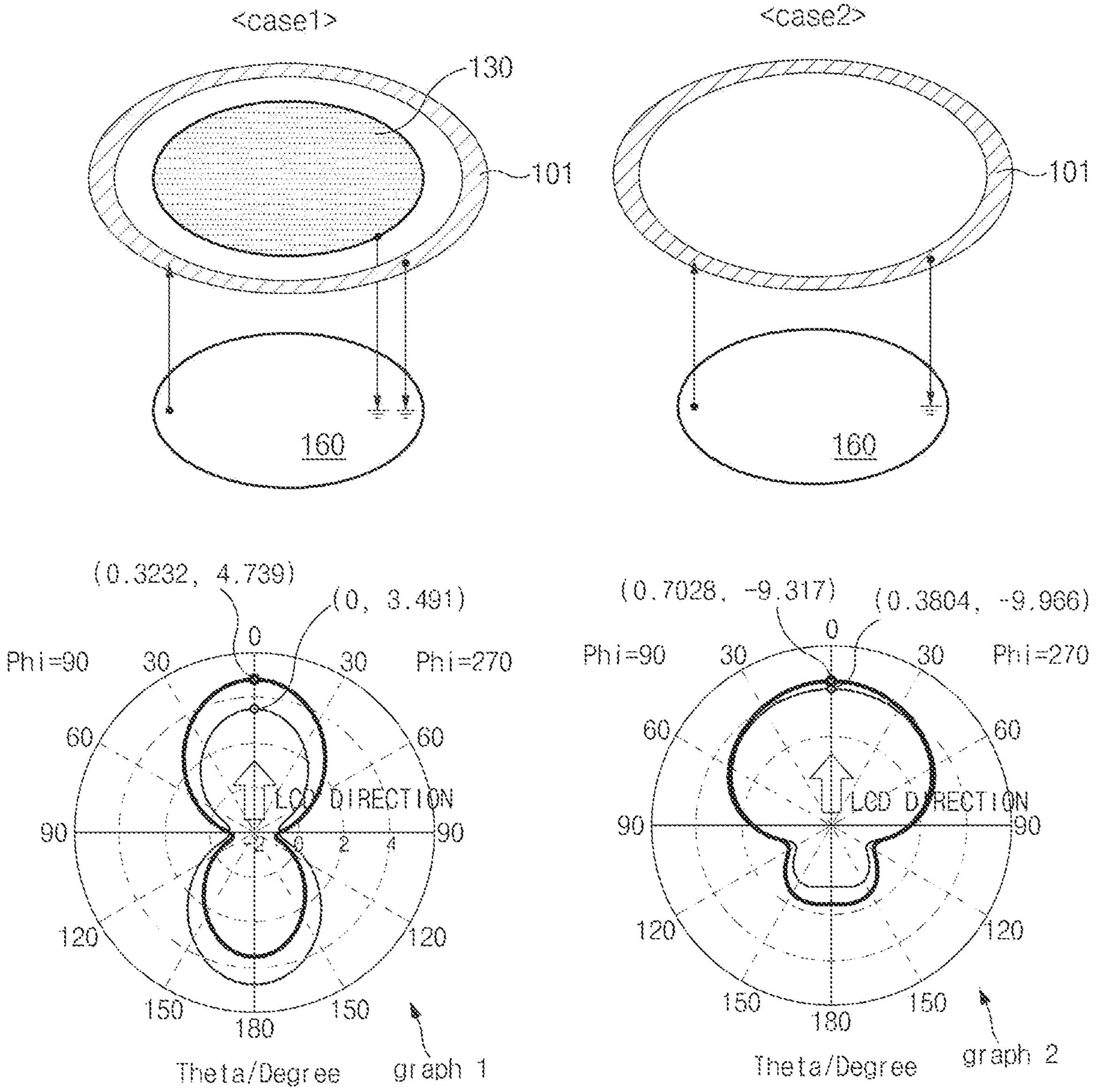
FIG. 9 is a diagram illustrating radiation patterns associated with the existence of a display and a wearing situation, according to an embodiment.

FIG. 9 is a diagram illustrating radiation patterns associated with the existence of a display and a wearing situation, according to an embodiment.

In FIG. 9, it is assumed that <case 1> corresponds to the case where the display 130 according to various embodiments operates as a portion of a radiator of a patch antenna and that <case 2> corresponds to the case where the display 130 does not operate as a portion of a radiator of a patch antenna. For comparison, <case 2> may be understood as the case where the display 130 does not exist.

In FIG. 9, a first graph "graph 1" indicates radiation patterns of <case 1> and <case 2> in a state where a user does not wear the wearable device 100. The radiation pattern corresponding to <case 1> is illustrated by a bold solid line, and the radiation pattern corresponding to <case 2> is illustrated by a thin solid line. In <case 1>, the display 130 operates as a parasitic patch antenna through coupling; as a result, directivity increases in the direction of an LCD (e.g., a first direction) compared to <case 2> in which the display 130 does not exist.

In FIG. 9, a second graph "graph 2" indicates radiation patterns of <case 1> and <case 2> in a state where the user wears the wearable device 100. Radiation of a second direction (a direction opposite to the LCD direction) is limited by a body of the user in a state where the user wears the wearable device 100 on his/her wrist, and the radiation pattern of the first direction is reinforced. That is, as directivity increases in the first direction with the wearable device 100 mounted on the wrist, the loss due to the wrist decreases, and thus, a total gain of an antenna increases.

According to an embodiment, since one point of the display 130 operates as a parasitic patch antenna connected with the ground region, receive performance may increase. For example, in the case of receiving a signal, such as a GPS signal, from a satellite for the purpose of seizing position information of the wearable device 100, the receive performance of an antenna may increase.

Figure 10A:
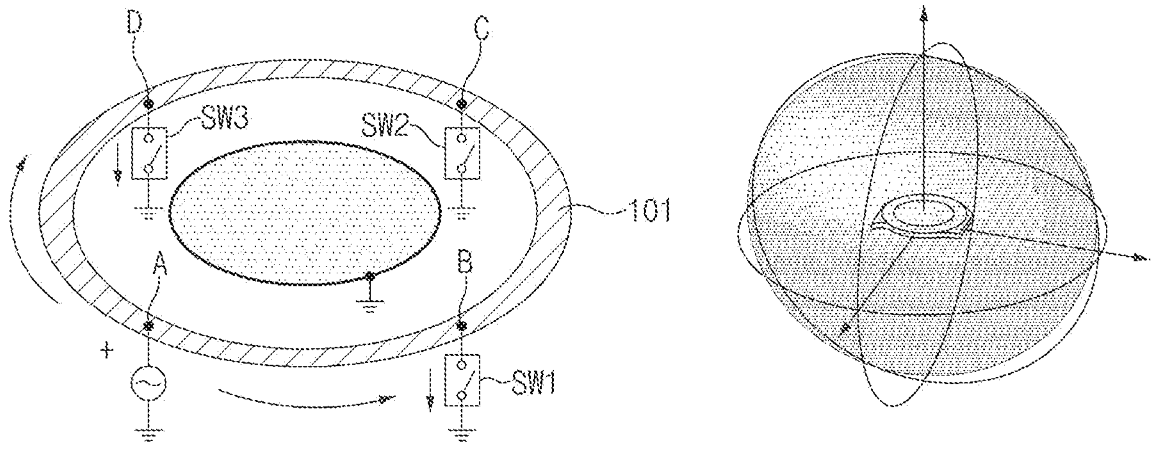
FIG. 10A is a diagram illustrating an example in which a metal structure and a ground region are connected at a plurality of points, according to an embodiment.
Figure 10B:
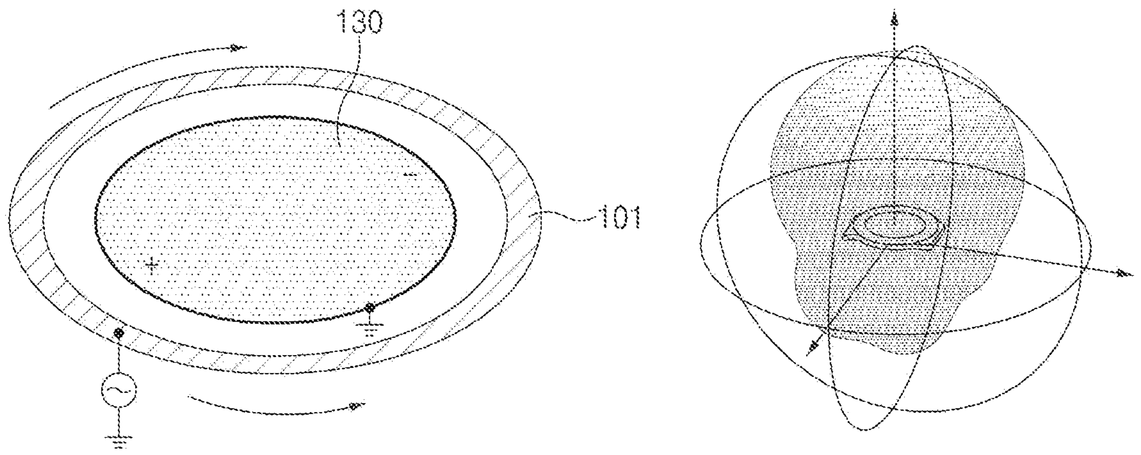
FIG. 10B is a diagram illustrating an example in which a metal structure and a ground region are not connected.

FIG. 10A is a diagram illustrating an example in which a metal structure and a ground region are connected at a plurality of points, according to an embodiment. FIG. 10B is a diagram illustrating an example in which a metal structure and a ground region are not connected.

Referring to FIG. 10A, the metal structure 101 may be connected with a ground region by a C-clip including a switch, or the like. For example, in the case where feeding is made at the first point "A" of the metal structure 101, a plurality of points "B", "C", and "D" of the metal structure 101 may be connected with the ground region. For example, the metal structure 101 may be connected with the ground region at the three different points "B", "C", and "D". The ground region may be positioned at the PCB 160, or may correspond to any other metal component within the wearable device 100.

In FIG. 10A, an electrical path of a loop shape, which connects the ground region, the feeding point, the ground point, and the ground region, may be formed. For example, in the case of FIG. 10A, at least two loop structures may be formed along arrow directions. In the case the at least two loop structures are formed, an antenna of the wearable device 100 may have an omnidirectional radiation pattern in which directivity is small as illustrated in FIG. 10A. That is, the antenna of the wearable device 100 may have a radiation pattern which is somewhat uniform in all directions.

FIG. 1013 may correspond to a state where switches SW1, SW2, and SW3 of FIG. 10A are opened. In this case, a current induced at the metal structure 101 may allow the metal layer of the display 130 to operate as a patch antenna. In this state, the antenna of the wearable device 100 may have a directional radiation pattern which faces the first direction (e.g., a front surface of the display 130) as illustrated in FIG. 10B.

The control circuit of the wearable device 100 may control the open/short of switches connected with the metal structure 101 depending on a situation. For example, since a direction of an antenna continuously changes in a situation where the user wears the wearable device 100 and walks, the control circuit may close the switches to allow the antenna to operate in a loop mode. For another example, in the case where the user looks at the display 130 of the wearable device 100, the control circuit may open the switches to allow the antenna to operate in a patch mode.

The mode change may be performed based on a sensor mounted on the wearable device 100 or an application being executed in the wearable device 100. For example, the wearable device 100 may include a motion sensor which senses the movement of the wearable device 100. The motion sensor may, for example, and without limitation, correspond to at least one or more of for example, an acceleration sensor, an inertial sensor, a gyro sensor, or the like. In the ease where the movement sensed by the motion sensor is determined as corresponding to walk or running, for example, as the loop mode is appropriate (e.g., as a direction of an antenna continuously changes), the control circuit may close the switches to allow the antenna to operate in the loop mode. However, in the case where a direction of a display sensed by the motion sensor is determined as facing a specific direction or being maintained in the specific direction, the control circuit may sense that the user looks at a screen of the wearable device 100 and may operate the antenna in the patch mode. In another exemplification, in the case where a screen of the display 130 in the wearable device 100 is in an ON state, the control circuit may sense that the user looks at the screen of the wearable device 100 and may operate the antenna in the patch mode.

In an embodiment, the control circuit may control a short switch which connects the metal structure 101 and the ground region in various cases. For example, the control circuit may sense the movement of the user's wrist using the motion sensor and may control the short switch such that an antenna has a directional radiation pattern whenever it is determined that the user raises his/her hand.

Also, the control circuit may perform switching to an antenna pattern which is appropriate for an application being executed. For example, in the case where an application such as a golf application, a swimming application, or a running application is being executed, the wearable device 100 needs to obtain an exact position of the user through the GPS. In this case, to receive a satellite signal well, the wearable device 100 may open all the switches such that the antenna has a directional antenna pattern.

In addition, the control circuit may sense whether to wear the wearable device 100 using an optical sensor (e.g., a camera, an illuminance sensor, an infrared sensor, or the like) and may control the switches so as to have different radiation patterns depending on whether to wear the wearable device 100. Also, the control circuit may sense heat, which is generated from a wrist while wearing the wearable device 100, through a temperature sensor and may control the switches for the purpose of decreasing a specific absorption rate (SAR). For example, the control circuit may control the switches so as to operate in the patch mode where a radiation pattern is focused in the direction of the LCD, instead of the loop mode where a radiation pattern is mainly formed in the direction of the wrist. Various exemplifications will be described with reference to FIG. 11.

Figure 10C:
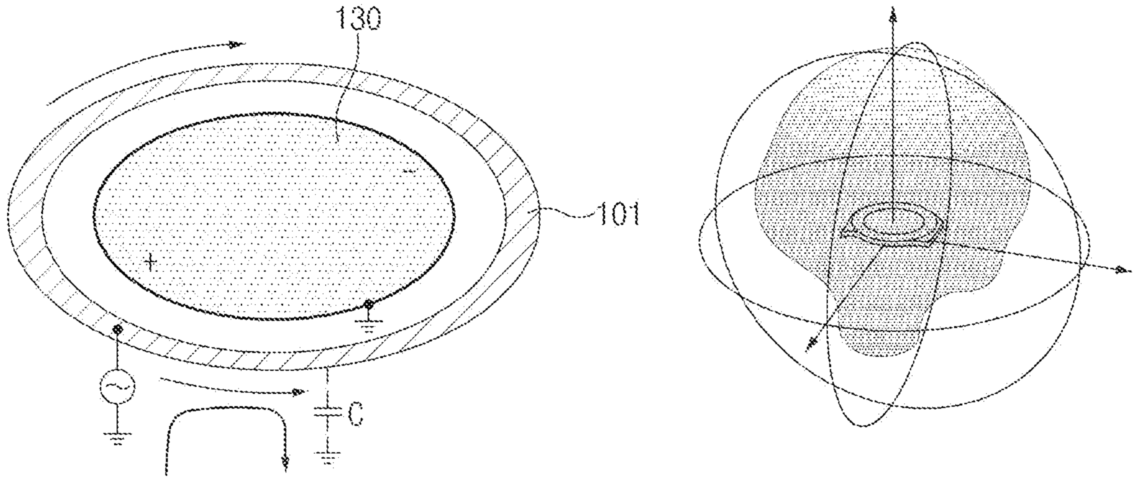
FIG. 10C is a diagram illustrating an example in which a metal structure is connected with a ground region through a coupling effect, according to an embodiment.

FIG. 10C is a diagram illustrating an example in which a metal structure is connected with a ground region through a coupling effect, according to an embodiment.

Referring to FIG. 10C, the metal structure 101 may be connected with the ground region indirectly through the coupling with the ground region. For example, a C-clip which is electrically connected with the metal structure 101 may be coupled with the ground region of the PCB 160 or may be connected with the ground region through an additional coupling capacitor. This structure will be more fully described below with reference to FIGS. 13A and 13B.

In addition to the patch antenna described with reference to FIG. 1013, in the case of FIG. 10C, a portion of the metal structure 101 may be used as an additional antenna, for example, through an electrical path from a feeding point to a ground point by the coupling. According to an embodiment, the metal layer of the display 130 may be used as a GPS antenna, and the portion of the metal structure 101 may be used as a Bluetooth or Wi-Fi antenna.

A radiation pattern of an antenna corresponding to the case where the metal structure 101 is connected with the ground region through the coupling may be observed from FIG. 10C. In this state, as in the case illustrated in FIG. 1.0B, the antenna using the metal layer of the display 130 may have a directional radiation pattern which faces the first direction (e.g., a front surface of the display 130). Compared to the radiation pattern illustrated in FIG. 1.0B, a radiation pattern at the metal layer of the display 130 in the case where the portion of the metal structure 101 is used as a separate antenna is similar to a radiation pattern in the case where the metal structure 101 is not connected with the ground region.

Figure 11:
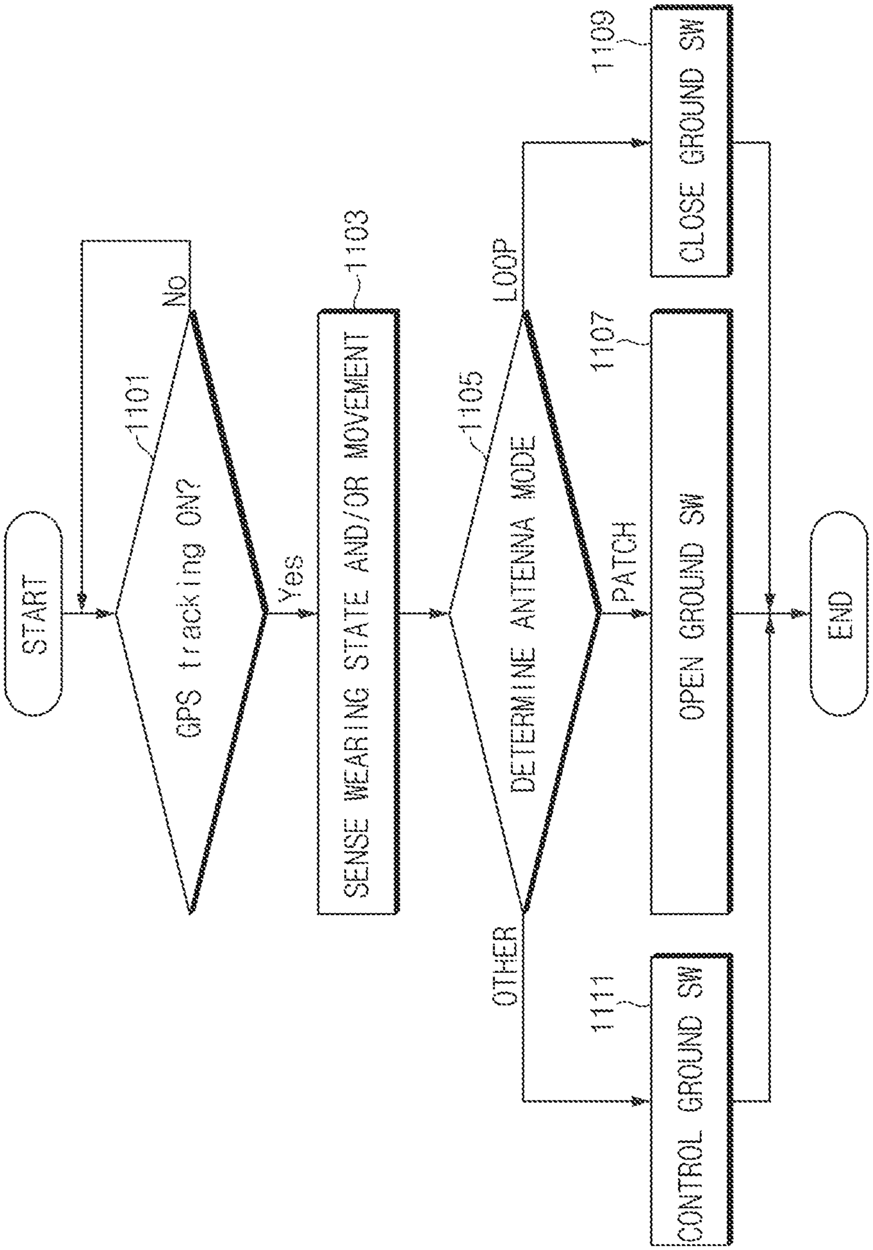
FIG. 11 is a flowchart illustrating a switch control scenario of an antenna according to an embodiment.

FIG. 11 is a flowchart illustrating a switch control scenario of an antenna according to an embodiment.

Referring to FIG. 11, in operation 1101, the control circuit of the wearable device 100 may determine whether GPS tracking is in an ON state. In the case where the GPS tracking is in an OFF state by user setting or device setting, the wearable device 100 may control an antenna for the purpose of receiving a signal of any other network such as a cellular network or a Wi-Fi network.

In the case where the GPS tracking is in the ON state, in operation 1103, the wearable device 100 may sense a wearing state and/or movement of the wearable device 100. For example, the wearable device 100 may sense the wearing state and/or movement using an acceleration sensor, a gyro sensor, an inertial sensor, a heart rate sensor, or the like.

In operation 1105, the wearable device 100 may determine an antenna mode appropriate for a current state. The wearable device 100 may use information about the wearing state and/or movement collected in operation 1103 for the purpose of determining the antenna mode. Also, additionally or alternatively, the wearable device 100 may further utilize an operating state of a hardware component of the device, an operating state of software being executed, or the like. For example, the wearable device 100 may utilize whether the display 130 is in an ON state, as information for determining the antenna mode. Also, the wearable device 100 may utilize an application or a function being currently executed, as information for determining the antenna mode.

For example, as described with reference to FIGS. 10A and 1013, in the case where the golf or running application is being executed, the control circuit may determine that the patch mode in which a GPS signal is well received is appropriate. Alternatively, in the case where the screen of the display 130 is in the ON state, the control circuit may sense that the user looks at the screen of the wearable device 100 and may determine that it is appropriate to operate the antenna in the patch mode. In this case, the wearable device 100 may open ground switches (e.g., SW1, SW2, and SW3) in operation 1107, and may operate the antenna in the patch mode for the purpose of well receiving the UPS signal.

For another example, in the case where the movement sensed by the motion sensor corresponds to walk or running, it may be determined that a direction of the antenna continuously changes; thus, the control circuit may determine that the loop mode is appropriate. In this case, the wearable device 100 may close at least a part of the ground switches (e.g., SW1, SW2, and SW3) in operation 1109, and may operate the antenna in the loop mode.

In addition, the control circuit may receive a signal in a specified frequency band by appropriately controlling the close/open of switches (e.g., SW1, SW2, and SW3). For example, in a first switch combination (e.g., with SW1 closed and with SW2 and SW3 opened), the wearable device 100 may be optimized to receive a Wi-Fi signal. For another example, in a second switch combination (e.g., with SW1 and SW3 opened and with SW2 closed), the wearable device 100 may be optimized to receive a signal in a WCDMA band (a 2.1 GHz band). In addition to the loop mode and the patch mode, the control circuit may secure optimal performance by appropriately controlling the open/close of the switches in operation 1111 depending on a current operating state.

According to an embodiment, information for controlling at least one or more switches (e.g., SW1, SW2, and SW3) depending on an operating state of the wearable device 100 may be stored in a memory of the wearable device 100.

Figure 12:
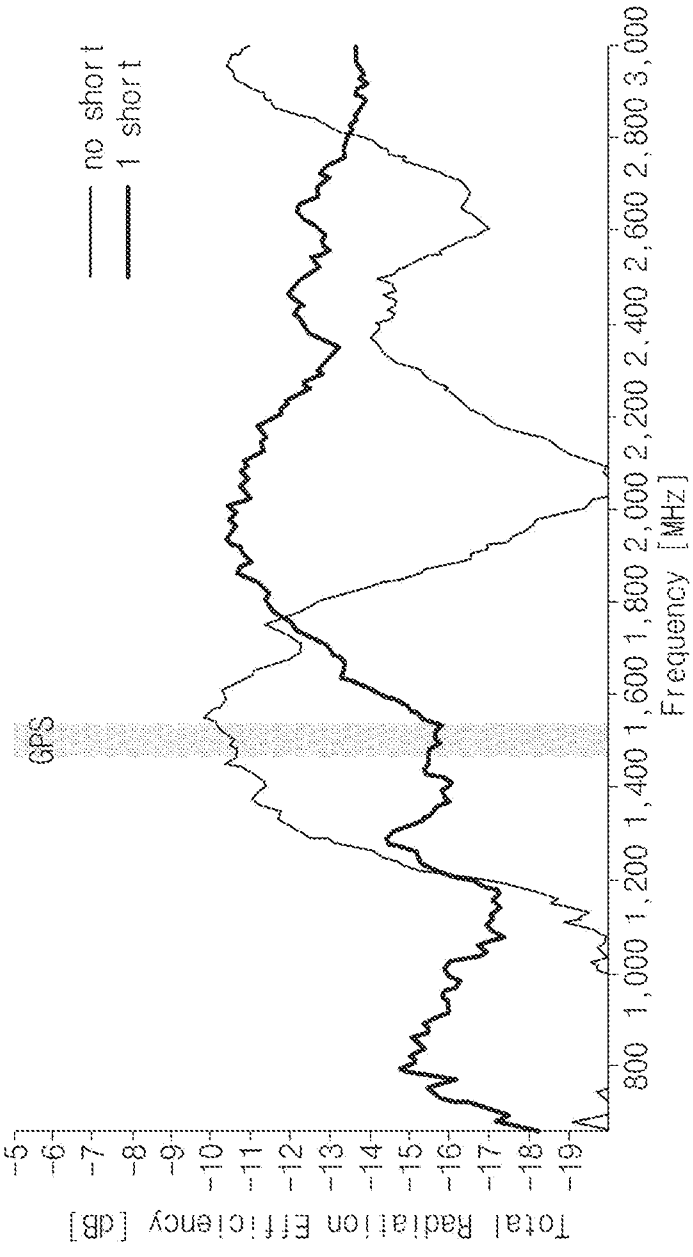
FIG. 12 is a graph illustrating radiation efficiency for each frequency band according to the number of grounds connected between a metal structure and a ground region.

FIG. 12 is a graph illustrating radiation efficiency for each frequency band according to the number of grounds connected between a metal structure and a ground region.

Referring to FIG. 12, it is observed that efficiency of a signal is good in a band ranging from approximately 180 MHz to approximately 2100 MHz when a metal structure (e.g., the metal structure 101) is grounded at one point. It is observed that a signal is good in a 1500 MHz band in the case where the ground of the metal structure is disconnected through a switch or the like, that is, in the case where the metal structure is not grounded. Accordingly, to improve receive sensitivity of the GPS signal, the control circuit may control switches between the metal structure 101 and the ground region such that the switches are opened (or such that the metal structure 101 is not grounded), in the case where GPS is used or in the case where an application where GPS is important is being executed.

Figure 13A:
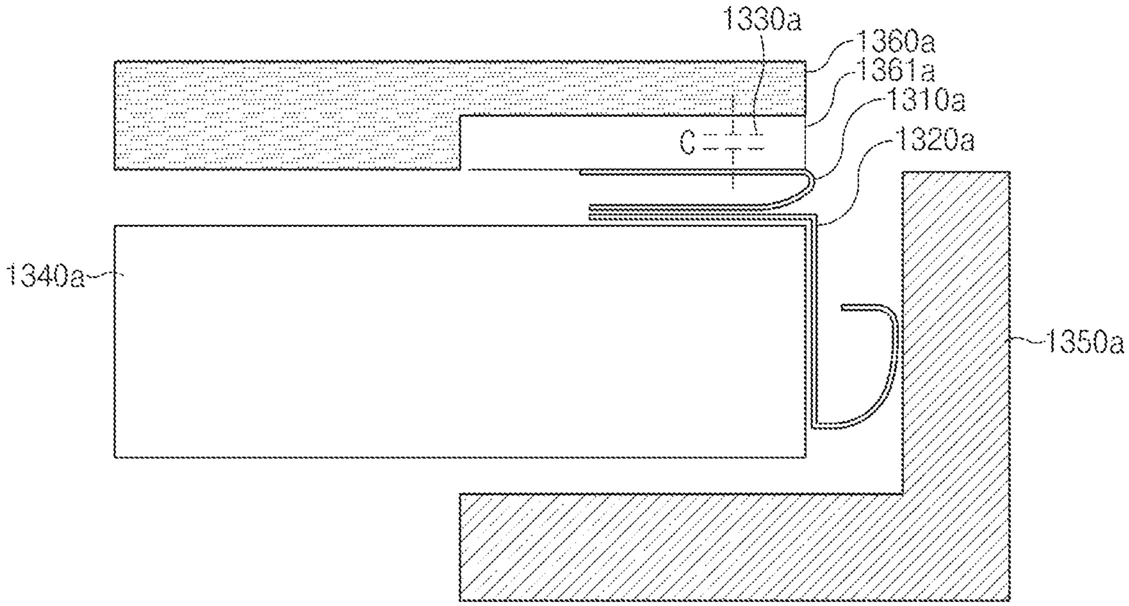
FIG. 13A is a diagram illustrating a side structure of a wearable device according to an embodiment.

FIG. 13A is a diagram illustrating a side structure of a wearable device according to an embodiment.

Figure 13B:
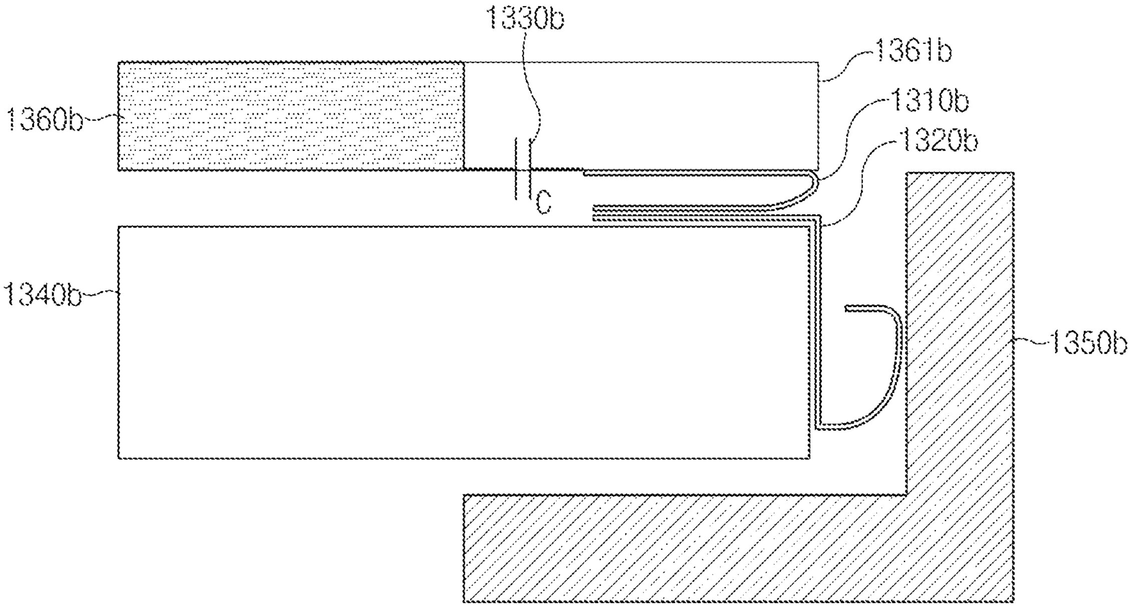
FIG. 13B is a diagram illustrating a side structure of a wearable device according to an embodiment.

FIG. 13B is a diagram illustrating a side structure of a wearable device according to an embodiment.

Referring to FIGS. 13A and 13B, an electrical path may be formed between a metal structure 1350*a* or 1350*b* and a ground region of a PCB 1360*a* or 1360*b*. According to an embodiment, a wearable device may include the metal structure 1350*a* or 1350*b*, a bracket 1340*a* or 1340*b*, or the PCB 1360*a* or 1360*b*. The bracket 1340*a* or 1340*b* may be electrically connected with one point of the metal structure 1350*a* or 1350*b* through a side-clip 1320*a* or 1320*b*. The side-clip 1320*a* or 1320*b* may be electrically connected with a C-clip 1310*a* or 1310*b*. According to various embodiments, the side-clip 1320*a* or 1320*b* may be referred to as a "first C-clip", and the C-clip 1310*a* or 1310*b* may be referred to as a "second C-clip". For another example, the side-clip 1320*a* or 1320*b* and the C-clip 1310*a* or 1310*b* may be integrally implemented.

According to an embodiment, a part 1361*a* of layers in the PCB 1360*a* may be removed as illustrated in FIG. 13A. In an embodiment, the PCB 1360*a* where the part of the layers is removed may be understood to be the same as or similar to the case where the part 1361*a* of the layers in the PCB 1360*a* is formed of a dielectric. A ground region of the PCB 1360*a* where the part 1361*a* of the layers is removed may be connected with the C-clip 1310*a* through coupling. For example, the ground region of the PCB 1360*a* may operate as if the ground region is connected with the C-clip 1310*a* through a virtual coupling capacitor 13:30*a*.

According to an embodiment, since the C-clip 1310*a* is connected with the metal structure 1350*a* through the side-clip 1320*a*, the metal structure 1350*a* may be coupled with the ground region of the PCB 1360*a*. In an embodiment, since a first point of the metal structure 1350*a* may be fed, an antenna may be used through an electrical path from a feeder to the ground region.

According to an embodiment, the whole layer 1361*b* belonging to a partial region of the PCB 1360*b* may be removed as illustrated in FIG. 13B. In this case, since the area for coupling between the C-clip 1310*b* and the ground region of the PCB 1360*b* where the whole layer 1361*b* is removed is insufficient, it may be difficult to connect the ground region of the PCB 1360*b* with the C-clip 1310*b* through coupling. For this reason, the ground region and the C-clip 1310*b* may be connected through a capacitor 1330*b* having a specified capacitance (e.g., 0.5 pF to 1.0 pF). Since the C-clip 1310*b* may be connected with the metal structure 1350*b* through the side-clip 1320*b*, the metal structure 1350*b* may be electrically connected with the ground region. In an embodiment, since a first point of the metal structure 1350*b* may be fed, at least a portion of the metal structure 1350*b* may be used as an antenna through an electrical path from a feeder to the ground region of the PCB 1360*b*.

Figure 14:
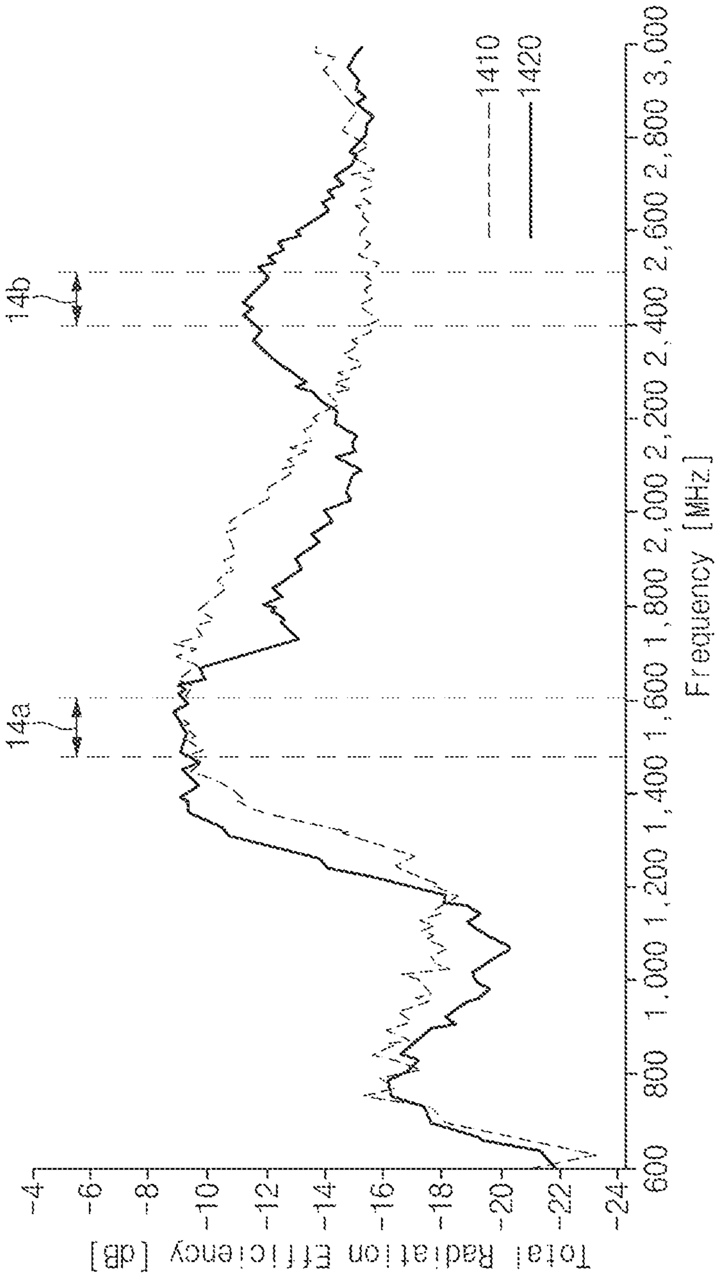
FIG. 14 is a graph illustrating radiation efficiency of a wearable electronic device according to an embodiment.

FIG. 14 is a graph illustrating radiation efficiency of a wearable electronic device according to an embodiment.

Referring to FIG. 14, a first graph 1410 may represent radiation efficiency of the wearable device 100 in which the metal structure 101 is not connected with the ground region. A second graph 1420 may represent radiation efficiency of the wearable device 100 in which the metal structure 101 is indirectly connected with the ground region of the PCB 160 through coupling.

A first zone 14*a* may represent a frequency band which ranges from approximately 1.5 GHz to approximately 1.6 GHz and in which GPS communication may be performed. In the first zone 14*a*, both the first graph 1410 and the second graph 1420 may have radiation efficiency of approximately −10 dB, thereby making it possible to transmit/receive a signal with high efficiency.

A second zone 14*h* may represent a frequency band which ranges from approximately 2.4 GHz to approximately 2.5 GHz and in which Bluetooth or Wi-Fi communication may be performed. In the second zone 14*b*, the first graph 1410 may have radiation efficiency of approximately −16 dB and the second graph 1420 may have radiation efficiency of approximately −11 dB, thereby making it possible to transmit/receive a signal with high efficiency.

A wearable device according to various embodiments of the present disclosure may transmit a signal with excellent efficiency in the Bluetooth communication and the Wi-Fi communication, as well as the UPS communication, in the case where the metal structure 101 and the ground region of the PCB 160 are connected using a coupling effect. Accordingly, it may be unnecessary to additionally implement a separate antenna for Bluetooth communication or a separate antenna for Wi-Fi communication. This may mean that the wearable device 100 is further miniaturized and costs are reduced.

Figure 15A:
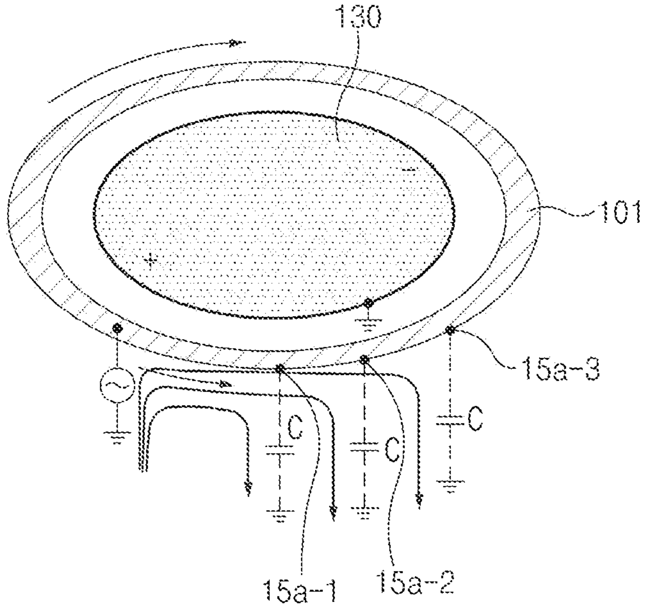
FIG. 15A is a diagram illustrating a method for shifting a resonance point of a wearable device according to an embodiment.

FIG. 15A is a diagram illustrating a method for shifting a resonance point of a wearable device according to an embodiment.

Figure 15B:
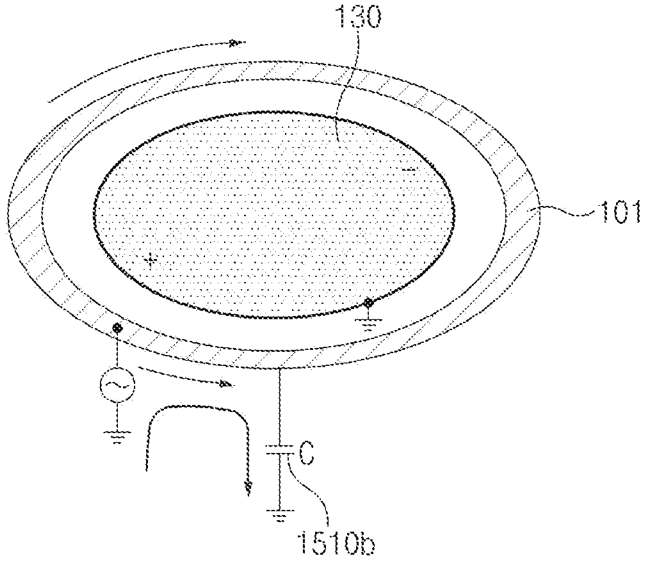
FIG. 15B is a diagram illustrating a method for shifting a resonance point of a wearable device according to an embodiment.

FIG. 15B is a diagram illustrating a method for shifting a resonance point of a wearable device according to an embodiment.

Figure 15C:
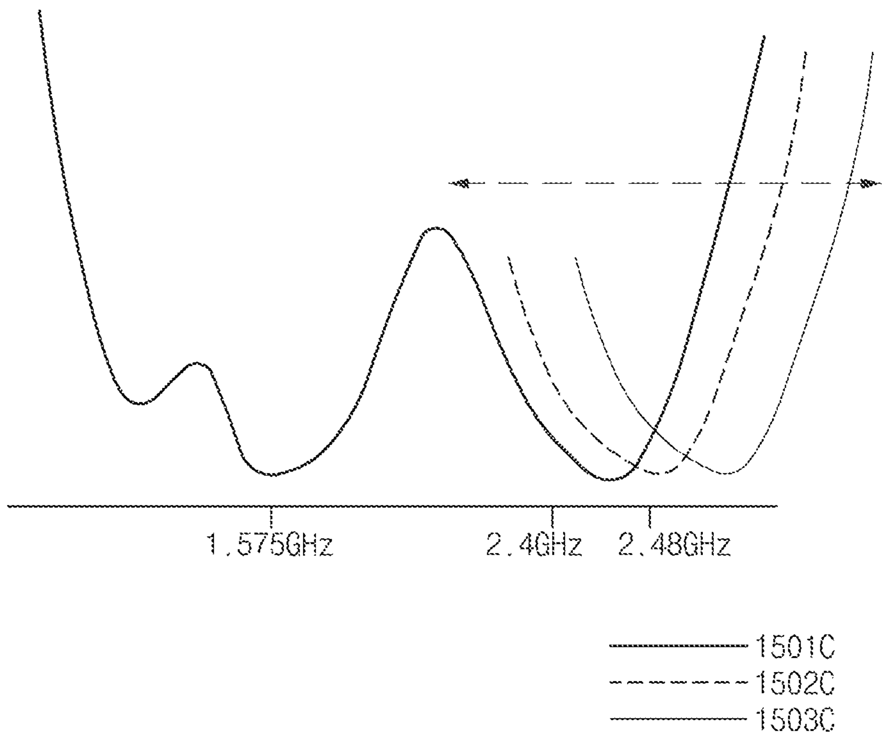
FIG. 15C is a graph illustrating radiation efficiency of a wearable device according to an embodiment.

FIG. 15C is a graph illustrating radiation efficiency of a wearable electronic device according to an embodiment.

Referring to FIGS. 15A and 1513, the wearable device 100 may electromagnetically connect the metal structure 101 and the ground region of the PCB 160 using a coupling effect. The wearable device 100 illustrated in FIG. 15A may electromagnetically connect, for example, the metal structure 101 and the ground region of the PCB 160 using the coupling between the ground region and the C-clip 1310*a* as illustrated in FIG. 13A. The wearable device 100 illustrated in FIG. 15B may electromagnetically connect, for example, the metal structure 101 and the ground region of the PCB 160 using the capacitor 1330*b* interposed between the ground region and the C-clip 1310*b* as illustrated in FIG. 13B.

As illustrated in FIG. 15A, in the case where a specific position of the metal structure 101, which is electrically connected with the ground region of the PCB 160 is changed, a resonance point of an antenna may be changed. For example, the ground region may be electromagnetically connected with a first point 15*a*-1, a second point 15*a*-2, or a third point 15*a*-3 of the metal structure 101. Since a length of a formed electrical path varies with each case, a resonance point of an antenna may be changed.

In an embodiment, a resonant frequency corresponding to the case where the ground region is electromagnetically connected with the first point 15*a*-1 of the metal structure 101 may be higher than a resonant frequency corresponding to the case where the ground region is electromagnetically connected with the second point 15*a*-1 of the metal structure 101. In another embodiment, a resonant frequency corresponding to the case where the ground region is electromagnetically connected with the third point 15*a*-3 of the metal structure 101 may be lower than the resonant frequency corresponding to the case where the ground region is electromagnetically connected with the second point 15*a*-2 of the metal structure 101.

As illustrated in FIG. 15B, in the case where a capacitance of a capacitor 1510*b* interposed between the ground region of the PCB 160 and the C-clip 1310*b* is changed, a resonance point of an antenna may be changed. For example, a resonant frequency may decrease as a capacitance value of the capacitor 1510*b* becomes relatively great. For another example, a resonant frequency may increase as a capacitance value of the capacitor 1510*b* becomes relatively small.

Radiation efficiency of an antenna, the resonant frequency of which is shifted, may be observed from FIG. 15C. It may be observed that a resonant frequency of a first graph 1501C becomes lower than a resonant frequency of a second graph 1502C and that a resonant frequency of a third graph 1503C becomes higher than the resonant frequency of the second graph 15020. A wearable device according to various embodiments of the present disclosure may finely adjust a resonant frequency of an antenna.

Below, hardware and software configurations applicable to the wearable device 100 according to various embodiments of the present disclosure will be described with reference to FIGS. 16 to 18.

Referring to FIGS. 1 to 15C, a wearable electronic device according to an embodiment may include a housing that includes an upper surface, a lower surface, and a side surface surrounding a space between the upper surface and the lower surface. In this case, the side surface may include a ring-shaped member (e.g., the metal structure 101) which is ring-shaped, when viewed from above the upper surface, and is formed of a conductive material. In an embodiment, the ring-shaped member may be substantially a circle when viewed from above the upper surface. In another embodiment, the ring-shaped member may be substantially a square or a rectangle.

Also, the wearable device may include a binding structure that is connected to the housing and is removably mountable on a portion of a body of a user. However, in an embodiment, the binding structure may be separated from the wearable device.

The wearable device may include a display (e.g., the display 130) which includes a first ground plane substantially parallel to the upper surface, within the space. The display may be exposed through the upper surface of the housing. Also, the wearable device may include a printed circuit board (e.g., the PCB 160) that includes a second ground plane interposed between the display and the lower surface, within the space, a wireless communication circuit that is positioned on the printed circuit board and is electrically connected to a first point (e.g., the point "A" of FIG. 2) positioned at the ring-shaped member, a first conductive path that is electrically connected between a second point (e.g., the point B' of FIG. 2) positioned at an edge of the first ground plane and the second ground plane, a second conductive path that is electrically connected between a third point (e.g., the point "B" of FIG. 2) positioned at the ring-shaped member and the second ground plane, and a processor that is positioned within the space and is electrically connected to the display and the communication circuit. In an embodiment, the communication circuit may be configured to receive a CPS signal.

According to an embodiment, when viewed from above the upper surface, a first imaginary line extending from the center of the upper surface to the first point may be substantially at right angles to a second imaginary line extending from the center of the upper surface to the second point. Also, when viewed from above the upper surface, the first imaginary line may be substantially at right angles to a third imaginary line extending from the center of the upper surface to the third point. Also, when viewed from above the upper surface, the second imaginary line may be substantially aligned with the third imaginary line and may face in the same direction as the third imaginary line.

Also, according to an embodiment, when viewed from above the upper surface, the first imaginary line may be substantially aligned with a third imaginary line extending from the center of the upper surface to the third point and may face in a direction which is opposite to a direction of the third imaginary line.

According to an embodiment, the wearable device may further include a third conductive path which is electrically connected between a fourth point positioned at the ring-shaped member and the second ground plane, a fourth conductive path which is electrically connected between a fifth point positioned at the ring-shaped member and the second ground plane, a first switching circuit which opens or closes the second conductive path, a second switching circuit which opens or closes the third conductive path, and a third switching circuit which opens or closes the fourth conductive path, and the processor may selectively control the first to third switching circuits. Also, when viewed from above the upper surface, the first imaginary line may be substantially aligned with a fourth imaginary line extending from the center of the upper surface to the fourth point, and the first imaginary line may be substantially aligned with a fifth imaginary line extending from the center of the upper surface to the fifth point and may face in a direction which is opposite to a direction of the fifth imaginary line.

According to an embodiment, the wearable device may further include a detection circuit (e.g., a gyro sensor, an inertial sensor, or the like) that detects an orientation of the housing, and the processor may selectively control the first to third switching circuits based at least partially on the detected orientation.

According to an embodiment, the wearable device may include at least one conductive connection member electrically connected with a third point of the metal structure, and at least a portion of the at least one conductive connection member may be positioned to be coupled with the ground region of the PCB.

In an embodiment, the wearable electronic device may further include a bracket that is interposed between the display and the PCB within the housing, and the at least one conductive connection member may include a first C-clip that is in contact with the third point of the metal structure and the bracket and a second C-clip that is in contact with the first C-clip and a surface of the PCB.

According to an embodiment, at least a partial region of the PCB may include a first layer that includes at least a portion of a nonconductive material and a second layer that includes a portion of the ground region, and the at least a portion of the at least one conductive connection member may be coupled with the portion of the ground region included in the second layer by making contact with at least a portion of a non-conductive material region of the first layer.

According to an embodiment, the PCB may include a first region formed of a dielectric, and a second region including a ground region. The at least a portion of the at least one conductive connection member may be in contact with the first region, and the at least a portion of the at least one conductive connection member and the ground region of the second region may be electrically connected through a capacitor.

According to an embodiment, the control circuit may be configured to receive a GSP signal through a first electrical path formed by the metal structure and the metal layer, and to receive a Bluetooth signal through a second electrical path formed by the metal structure and the at least one conductive connection member.

A wearable electronic device according to an embodiment may include a housing that includes an upper surface, a lower surface, and a side surface surrounding a space between the upper surface and the lower surface, wherein the side surface includes a ring-shaped member which is ring-shaped, when viewed from above the upper surface, and is formed of a conductive material, a binding structure that is connected to the housing and is removably mountable on a portion of a body of a user, a display that is exposed through the upper surface and includes a first ground plane substantially parallel to the upper surface, within the space, a printed circuit board that includes a second ground plane interposed between the display and the lower surface, within the space, a wireless communication circuit that is positioned on the printed circuit board and is electrically connected to a first point positioned at the ring-shaped member, a first conductive path that is electrically connected between a second point positioned at an edge of the first ground plane and the second ground plane, a second conductive path that is electrically connected between a third point positioned at the ring-shaped member and the second ground plane, and a processor that is positioned within the space and is electrically connected to the display and the communication circuit. When viewed from above the upper surface, a first imaginary line extending from the center of the upper surface to the first point may be substantially at right angles to a second imaginary line extending from the center of the upper surface to the second point, and the second conductive path may include at least one conductive connection member positioned to be coupled with the second ground plane.

According to an embodiment, the wireless communication circuit may be configured to receive a GPS signal and a Bluetooth signal.

According to an embodiment, the third conductive path may include a capacitor.

Figure 16:
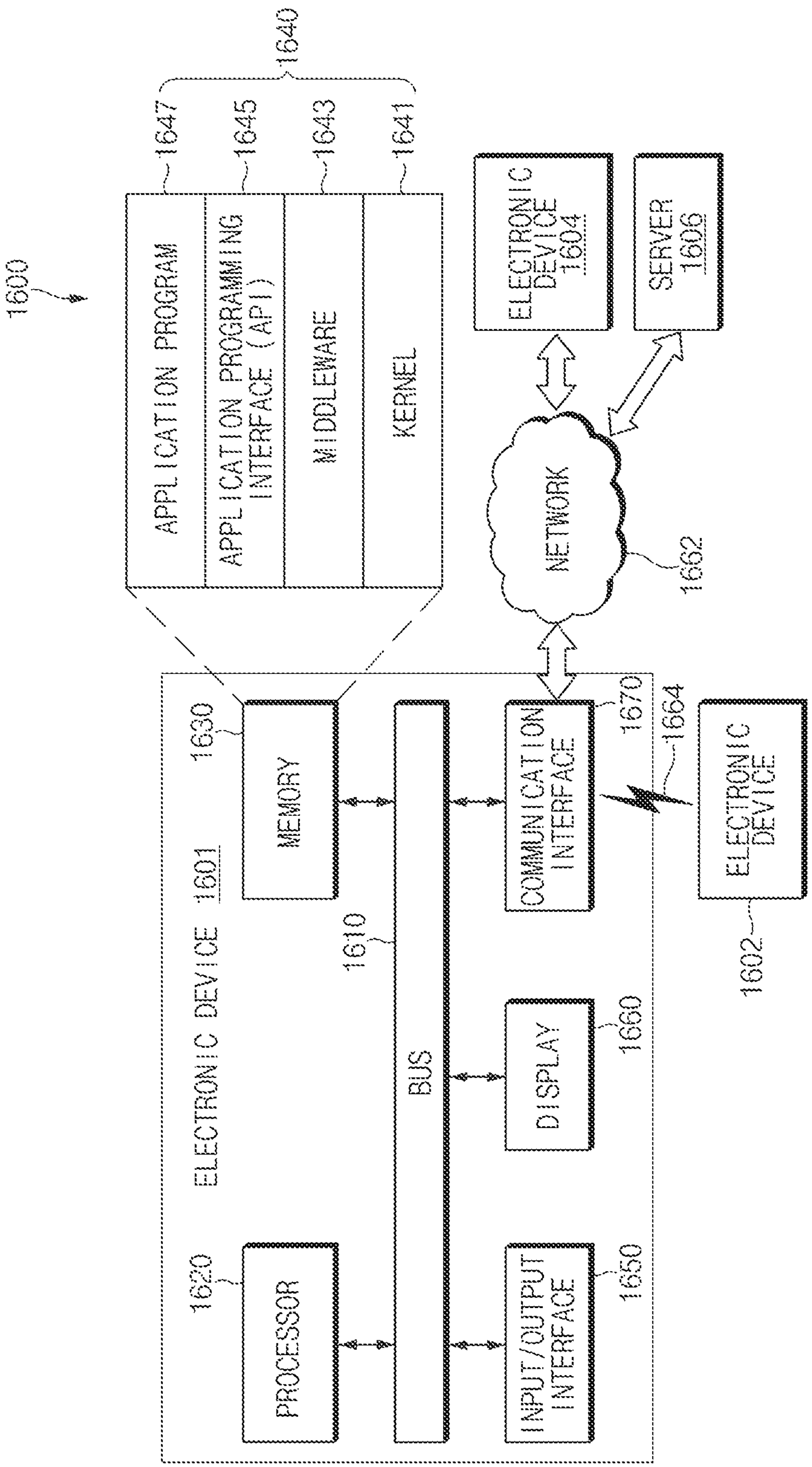
FIG. 16 is a block diagram illustrating an electronic device in a network environment according to various embodiments.

FIG. 16 is a block diagram illustrating an electronic device in a network environment system, according to various embodiments.

Referring to FIG. 16, according to various embodiments, an electronic device 1601, a first electronic device 1602, a second electronic device 1604, or a server 1606 may be connected each other over a network 1662 or a short range communication 1664. The electronic device 1601 may include a bus 1610, a processor 1620, a memory 1630, an input/output interface 1650, a display 1660, and a communication interface 1670. According to an embodiment, the electronic device 1601 may not include at least one of the above-described components or may further include other component(s).

For example, the bus 1610 may interconnect the above-described components 1620 to 1670 and may include a circuit for conveying communications (e.g., a control message and/or data) among the above-described components.

The processor 1620 may include one or more of a central processing unit (CPU), an application processor (AP), or a communication processor (CP). For example, the processor 1620 may perform an arithmetic operation or data processing associated with control and/or communication of at least other components of the electronic device 1601.

The memory 1630 may include a volatile and/or nonvolatile memory. For example, the memory 1630 may store commands or data associated with at least one other component(s) of the electronic device 1601. According to an embodiment, the memory 1630 may store software and/or a program 1640. The program 1640 may include, for example, a kernel 1641, a middleware 1643, an application programming interface (API) 1645, and/or an application program (or "an application") 1647. At least a part of the kernel 1641, the middleware 1643, or the API 1645 may be referred to as an "operating system (OS)".

For example, the kernel 1641 may control or manage system resources (e.g., the bus 1610, the processor 1620, the memory 1630, and the like) that are used to execute operations or functions of other programs (e.g., the middleware 1643, the API 1645, and the application program 1647). Furthermore, the kernel 1641 may provide an interface that allows the middleware 1643, the API 1645, or the application program 1647 to access discrete components of the electronic device 1601 so as to control or manage system resources.

The middleware 1643 may perform, for example, a mediation role such that the API 1645 or the application program 1647 communicates with the kernel 1641 to exchange data.

Furthermore, the middleware 1643 may process task requests received from the application program 1647 according to a priority. For example, the middleware 1643 may assign the priority, which makes it possible to use a system resource (e.g., the bus 1610, the processor 1620, the memory 1630, or the like) of the electronic device 1601, to at least one of the application program 1647. For example, the middleware 1643 may process the one or more task requests according to the priority assigned to the at least one, which makes it possible to perform scheduling or load balancing on the one or more task requests.

The API 1645 may be, for example, an interface through which the application program 1647 controls a function provided by the kernel 1641 or the middleware 1643, and may include, for example, at least one interface or function (e.g., an instruction) for a file control, a window control, image processing, a character control, or the like.

The input/output interface 1650 may play a role, for example, of an interface which transmits a command or data input from a user or another external device, to other component(s) of the electronic device 1601. Furthermore, the input/output interface 1650 may output a command or data, received from other component(s) of the electronic device 1601, to a user or another external device.

The display 1660 may include, for example, a liquid crystal display (LCD), a light-emitting diode (LED) display, an organic LED (OLED) display, a microelectromechanical systems (MEMS) display, or an electronic paper display. The display 1660 may display, for example, various contents e.g., a text, an image, a video, an icon, a symbol, and the like) to a user. The display 1660 may include a touch screen and may receive, for example, a touch, gesture, proximity, or hovering input using an electronic pen or a part of a user's body.

For example, the communication interface 1670 may establish communication between the electronic device 1601 and an external device (e.g., the first electronic device 1602, the second electronic device 1604, or the server 1606). For example, the communication interface 1670 may be connected to the network 1662 over wireless communication or wired communication to communicate with the external device (e.g., the second electronic device 1604 or the server 1606).

The wireless communication may use at least one of for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1664. The short range communication 1664 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the puke may generate a magnetic field signal. The electronic device 1601 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1662 may include at least one of telecommunications networks, for example, a computer network (e.g., LAN or WAN), an Internet, or a telephone network.

Each of the first and second electronic devices 1602 and 1604 may be a device of which the type is different from or the same as that of the electronic device 1601. According to an embodiment, the server 1606 may include a group of one or more servers. According to various embodiments, all or a portion of operations that the electronic device 1601 will perform may be executed by another or plural electronic devices (e.g., the first electronic device 1602, the second electronic device 1604 or the server 1606). According to an embodiment, in the case where the electronic device 1601 executes any function or service automatically or in response to a request, the electronic device 1601 may not perform the function or the service internally, but, alternatively additionally, it may request at least a portion of a function associated with the electronic device 1601 from another device (e.g., the electronic device 1602 or 1604 or the server 1606). The other electronic device may execute the requested function or additional function and may transmit the execution result to the electronic device 1601. The electronic device 1601 may provide the requested function or service using the received result or may additionally process the received result to provide the requested function or service. To this end, for example, cloud computing, distributed computing, or client-server computing may be used.

Figure 17:
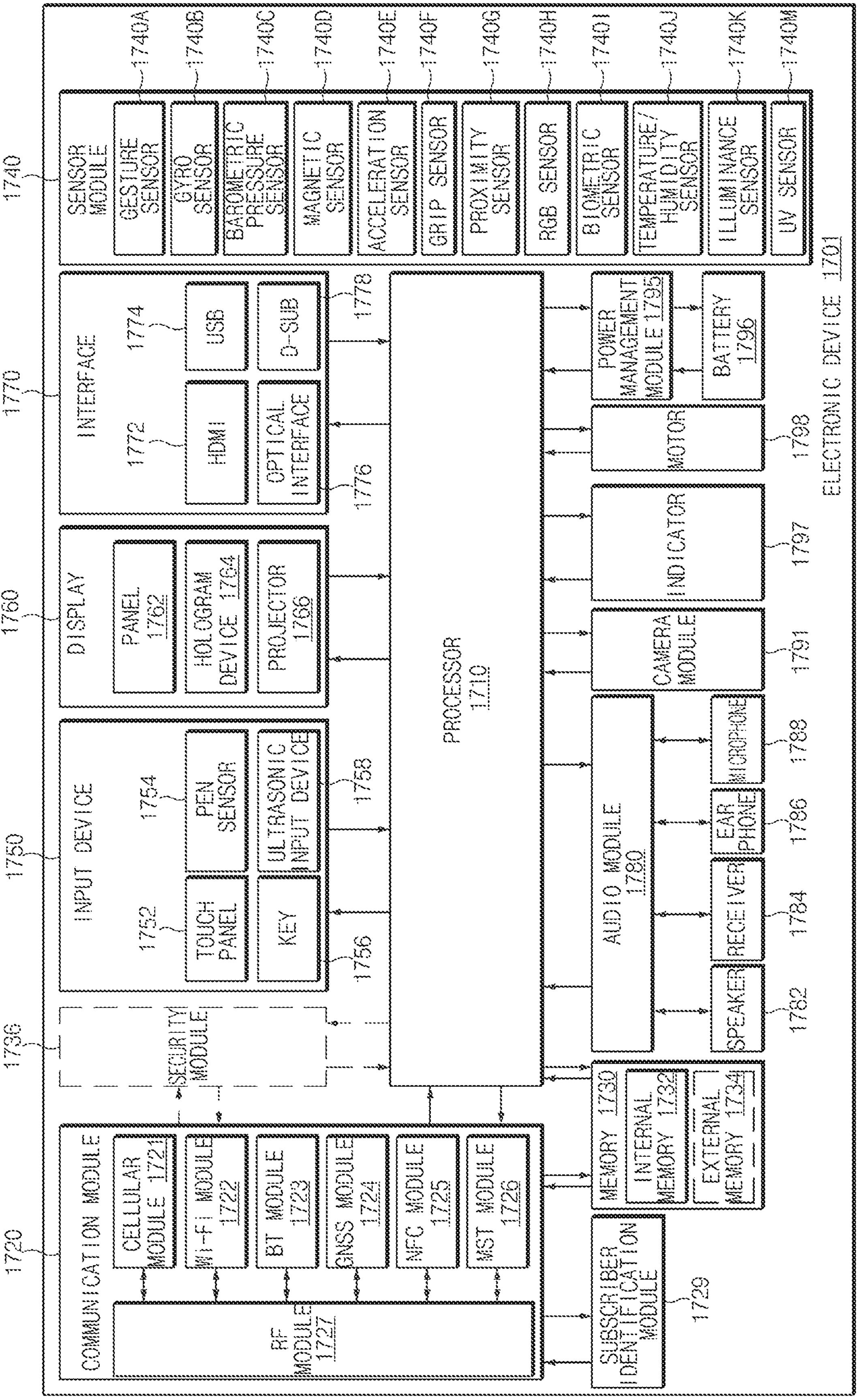
FIG. 17 is a block diagram illustrating an electronic device according to various embodiments and FIG. 18 illustrates a block diagram illustrating a program module according to various embodiments.

FIG. 17 is a block diagram illustrating an electronic device, according to various embodiments.

Referring to FIG. 17, an electronic device 1701 may include, for example, all or a part of the electronic device 1601 illustrated in FIG. 16. The electronic device 1701 may include one or more processors (e.g., including processing circuitry) (e.g., an application processor (AP)) 1710, a communication module (e.g., including communication circuitry) 1720, a subscriber identification module 1729, a memory 1730, a sensor module 1740, a security module (e.g., including a memory) 1736, an input device (e.g., including input circuitry) 1750, a display 1760, an interface (e.g., including interface circuitry) 1770, an audio module 1780, a camera module 1791, a power management module 1795, a battery 1796, an indicator 1797, and a motor 1798.

The processor 1710 may include various processing circuitry and drive, for example, an operating system (OS) or an application to control a plurality of hardware or software components connected to the processor 1710 and may process and compute a variety of data. For example, the processor 1710 may be implemented with a System on Chip (SoC). According to an embodiment, the processor 1710 may further include a graphic processing unit (GPU) and/or an image signal processor. The processor 1710 may include at least a part (e.g., a cellular module 1721) of components illustrated in FIG. 17. The processor 1710 may load a command or data, which is received from at least one of other components (e.g., a nonvolatile memory), into a volatile memory and process the loaded command or data. The processor 1710 may store a variety of data in the nonvolatile memory.

The communication module 1720 may be configured the same as or similar to the communication interface 1670 of FIG. 16. The communication module 1720 may include various processing circuitry included in various modules of the communication module, such as, for example, and without limitation, the cellular module 1721, a Wi-Fi module 1722, a Bluetooth (BT) module 1723, a GLASS module 1724 (e.g., a GPS module, a Glonass module, a Beidou module, or a Galileo module), a near field communication (NFC) module 1725, an MST module 1726, a radio frequency (RF) module 1727, or the like.

The cellular module 1721 may provide, for example, voice communication, video communication, a character service, an Internet service, or the like over a communication network. According to an embodiment, the cellular module 1721 may perform discrimination and authentication of the electronic device 1701 within a communication network using the subscriber identification module (e.g., a SIM card) 1729. According to an embodiment, the cellular module 1721 may perform at least a portion of functions that the processor 1710 provides. According to an embodiment, the cellular module 1721 may include a communication processor (CP).

Each of the Wi-Fi module 1722, the BT module 1723, the GNSS module 1724, the NFC module 1725, or the MST module 1726 may include a processor for processing data exchanged through a corresponding module, for example. According to an embodiment, at least a part (e.g., two or more) of the cellular module 1721, the Wi-Fi module 1722, the BT module 1723, the GNSS module 1724, the NFC module 1725, or the MST module 1726 may be included within one Integrated Circuit (IC) or an IC package.

For example, the RE module 1727 may transmit and receive a communication signal (e.g., an RE signal). For example, the RE module 1727 may include a transceiver, a power amplifier module (PAM), a frequency filter, a low noise amplifier (LNA), an antenna, or the like. According to another embodiment, at least one of the cellular module 1721, the Wi-Fi module 1722, the BT module 1723, the GNSS module 1724, the NEC module 1725, or the MST module 1726 may transmit and receive an RE signal through a separate RE module.

The subscriber identification module 1729 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1730 (e.g., the memory 1630) may include an internal memory 1732 and/or an external memory 1734. For example, the internal memory 1732 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1734 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1734 may be operatively and/or physically connected to the electronic device 1701 through various interfaces.

A security module 1736 may be a module that includes a storage space of which a security level is higher than that of the memory 1730 and may be a circuit that guarantees safe data storage and a protected execution environment. The security module 1736 may be implemented with a separate circuit and may include a separate processor. For example, the security module 1736 may be in a smart chip or a secure digital (SD) card, which is removable, or may include an embedded secure element (eSE) embedded in a fixed chip of the electronic device 1701. Furthermore, the security module 1736 may operate based on an operating system (OS) that is different from the OS of the electronic device 1701. For example, the security module 1736 may operate based on java card open platform (COP) OS.

The sensor module 1740 may measure, for example, a physical quantity or may detect an operation state of the electronic device 1701. The sensor module 1740 may convert the measured or detected information to an electrical signal. For example, the sensor module 1740 may include, for example, and without limitation, at least one of a gesture sensor 1740A, a gyro sensor 174013, a barometric pressure sensor 1740C, a magnetic sensor 1740D, an acceleration sensor 1740E, a grip sensor 1740F, the proximity sensor 1740G, a color sensor 1740H (e.g., red, green, blue (RGB) sensor), a biometric sensor 1740I, a temperature/humidity sensor 1740J, an illuminance sensor 1740K, and/or an UV sensor 1740M, or the like. Although not illustrated, additionally or alternatively, the sensor module 1740 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1740 may further include a control circuit for controlling at least one or more sensors included therein. According to an embodiment, the electronic device 1701 may further include a processor that is a part of the processor 1710 or independent of the processor 1710 and is configured to control the sensor module 1740. The processor may control the sensor module 1740 while the processor 1710 remains at a sleep state.

The input device 1750 may include various input circuitry, such as, for example, and without limitation, a touch panel 1752, a (digital) pen sensor 1754, a key 1756, and/or an ultrasonic input unit 1758, or the like. For example, the touch panel 1752 may use at least one of capacitive, resistive, infrared and ultrasonic detecting methods. Also, the touch panel 1752 may further include a control circuit. The touch panel 1752 may further include a tactile layer to provide a tactile reaction to a user.

The (digital) pen sensor 1754 may be, for example, a part of a touch panel or may include an additional sheet for recognition. The key 1756 may include, for example, a physical button, an optical key, a keypad, or the like. The ultrasonic input device 1758 may detect (or sense) an ultrasonic signal, which is generated from an input device, through a microphone (e.g., a microphone 1788) and may check data corresponding to the detected ultrasonic signal.

The display 1760 (e.g., the display 1660) may include, for example, and without limitation, a panel 1762, a hologram device 1764, and/or a projector 1766, or the like. The panel 1762 may be the same as or similar to the display 1660 illustrated in FIG. 16. The panel 1762 may be implemented, for example, to be flexible, transparent or wearable. The panel 1762 and the touch panel 1752 may be integrated into a single module. According to an embodiment, the panel 1762 may include a pressure sensor (or force sensor, interchangeably used hereinafter) that measures the intensity of touch pressure by a user. The pressure sensor may be implemented integrally with the touch panel 1752, or may be implemented as at least one sensor separately from the touch panel 1752. The hologram device 1764 may display a stereoscopic image in a space using a light interference phenomenon. The projector 1766 may project light onto a screen so as to display an image. For example, the screen may be arranged in the inside or the outside of the electronic device 1701. According to an embodiment, the display 1760 may further include a control circuit for controlling the panel 1762 the hologram device 1764, or the projector 1766.

The interface 1770 may include various interface circuitry, such as, for example, and without limitation, a high-definition multimedia interface (HDMI) 1772, a universal serial bus (USB) 1774, an optical interface 1776, and/or a D-subminiature (D-sub) 1778, or the like. The interface 1770 may be included, for example, in the communication interface 1670 illustrated in FIG. 16. Additionally or alternatively, the interface 1770 may include, for example, a mobile high definition link (MHL) interface, a SD card/multi-media card (MMC) interface, or an infrared data association (IrDA) standard interface.

The audio module 1780 may convert a sound and an electric signal in dual directions. At least a component of the audio module 1780 may be included, for example, in the input/output interface 1650 illustrated in FIG. 16. The audio module 1780 may process, for example, sound information that is input or output through a speaker 1782, a receiver 1784, an earphone 1786, or the microphone 1788.

For example, the camera module 1791 may shoot a still image or a video. According to an embodiment, the camera module 1791 may include at least one or more image sensors (e.g., a front sensor or a rear sensor), a lens, an image signal processor (ISP), or a flash (e.g., art LED or a xenon lamp).

The power management module 1795 may manage, for example, power of the electronic device 1701. According to an embodiment, a power management integrated circuit (PMIC), a charger IC, or a battery or fuel gauge may be included in the power management module 1795. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1796 and a voltage, current or temperature thereof while the battery is charged. The battery 1796 may include, for example, a rechargeable battery and/or a solar battery.

The indicator 1797 may display a specific state of the electronic device 1701 or a part thereof (e.g., the processor 1710), such as a booting state, a message state, a charging state, and the like. The motor 1798 may convert an electrical signal into a mechanical vibration and may generate the following effects: vibration, haptic, and the like. Although not illustrated, a processing device (e.g., a GPU) for supporting a mobile TV may be included in the electronic device 1701. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 18:
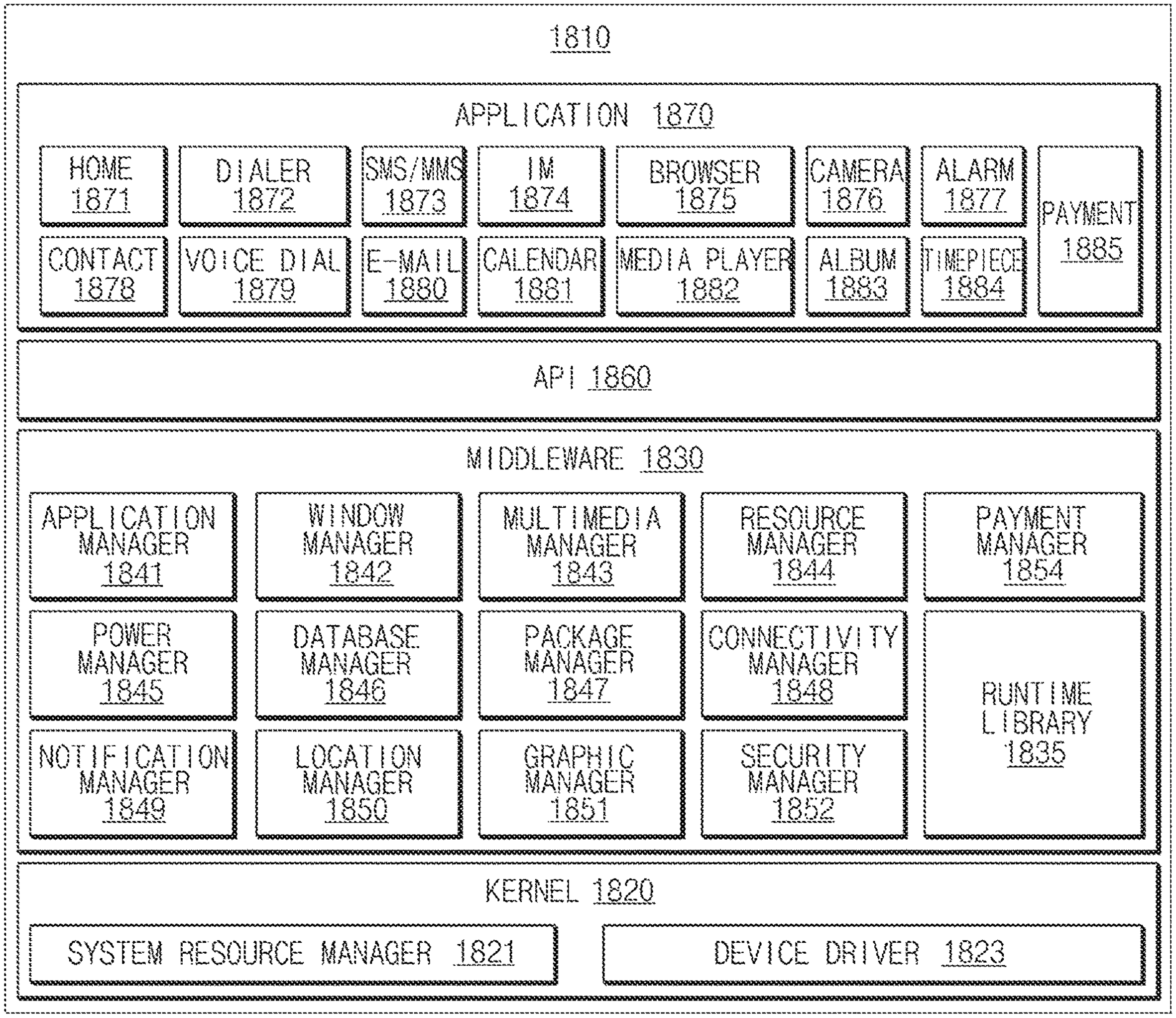

FIG. 18 is a block diagram illustrating a program module, according to various embodiments.

According to an embodiment, a program module 1810 (e.g., the program 1640) may include an operating system (OS) to control resources associated with an electronic device (e.g., the electronic device 1601), and/or diverse applications (e.g., the application program 1647) driven on the OS. The OS may be, for example, Android™, Windows™ Symbian™, or Tizen™.

The program module 1810 may include a kernel 1820, a middleware 1830, an application programming interface (API) 1860, and/or an application 1870. At least a portion of the program module 1810 may be preloaded on an electronic device or may be downloadable from an external electronic device (e.g., the first electronic device 1602, the second electronic device 1604, the server 1606, or the like).

The kernel 1820 (e.g., the kernel 1641) may include, for example, a system resource manager 1821 and/or a device driver 1823. The system resource manager 1821 may perform control, allocation, or retrieval of system resources. According to an embodiment, the system resource manager 1821 may include a process managing unit, a memory managing unit, or a file system managing unit. The device driver 1823 may include, for example, a display driver, a camera driver, a Bluetooth driver, a shared memory driver, a USB driver, a keypad driver, a Wi-Fi driver, an audio driver, or an inter-process communication (IPC) driver.

The middleware 1830 may provide, for example, a function that the application 1870 needs in common, or may provide diverse functions to the application 1870 through the API 1860 to allow the application 1870 to efficiently use limited system resources of the electronic device. According to an embodiment, the middleware 1830 (e.g., the middleware 1643) may include at least one of a runtime library 1835, an application manager 1841, a window manager 1842, a multimedia manager 1843, a resource manager 1844, a power manager 1845, a database manager 1846, a package manager 1847, a connectivity manager 1848, a notification manager 1849, a location manager 1850, a graphic manager 1851, a security manager 1852, and/or a payment manager 1854, or the like.

The runtime library 1835 may include, for example, a library module that is used by a compiler to add a new function through a programming language while the application 1870 is being executed. The runtime library 1835 may perform input/output management, memory management, or capacities about arithmetic functions.

The application manager 1841 may manage, for example, a life cycle of at least one application of the application 1870. The window manager 1842 may manage a graphic user interface (GUI) resource that is used in a screen. The multimedia manager 1843 may identify a format necessary for playing diverse media files, and may perform encoding or decoding of media files using a codec suitable for the format. The resource manager 1844 may manage resources such as a storage space, memory, or source code of at least one application of the application 1870.

The power manager 1845 may operate, for example, with a basic input/output system (BIOS) to manage a battery or power, and may provide power information for an operation of an electronic device. The database manager 1846 may generate, search for; or modify database that is to be used in at least one application of the application 1870. The package manager 1847 may install or update an application that is distributed in the form of package file.

The connectivity manager 1848 may manage, for example, wireless connection such as Wi-Fi or Bluetooth. The notification manager 1849 may display or notify an event such as arrival message, appointment, or proximity notification in a mode that does not disturb a user. The location manager 1850 may manage location information about an electronic device. The graphic manager 1851 may manage a graphic effect that is provided to a user, or manage a user interface relevant thereto. The security manager 1852 may provide a general security function necessary for system security, user authentication, or the like. According to an embodiment, in the case where an electronic device (e.g., the electronic device 1601) includes a telephony function, the middleware 1830 may further include a telephony manager for managing a voice or video call function of the electronic device.

The middleware 1830 may include a middleware module that combines diverse functions of the above-described components. The middleware 1830 may provide a module specialized to each OS kind to provide differentiated functions. Additionally, the middleware 1830 may dynamically remove a part of the preexisting components or may add new components thereto.

The API 1860 (e.g., the API 1645) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1870 (e.g., the application program 1647) may include, for example, and without limitation, one or more applications capable of providing functions for a home 1871, a dialer 1872, an SMS/MMS 1873, an instant message (IM) 1874, a browser 1875, a camera 1876, an alarm 1877, a contact 1878, a voice dial 1879, an e-mail 1880, a calendar 1881, a media player 1882, an album 1883, a timepiece 1884, and/or a payment 1885, or the like. Additionally, or alternatively, though not illustrated, various other applications may be including, such as, for example, applications for offering health care e.g.; measuring an exercise quantity, blood sugar, or the like) or environment information (e.g., information of barometric pressure, humidity, temperature, or the like).

According to an embodiment, the application 1870 may include an application (hereinafter referred to as "information exchanging application" for descriptive convenience) to support information exchange between an electronic device (e.g., the electronic device 1601) and an external electronic device (e.g., the first electronic device 1602 or the second electronic device 1604). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1870 may include an application (e.g., a health care application of a mobile medical device) that is assigned in accordance with an attribute of an external electronic device. According to an embodiment, the application 1870 may include an application that is received from an external electronic device (e.g., the first electronic device 1602, the second electronic device 1604, or the server 1606). According to an embodiment, the application 1870 may include a preloaded application or a third party application that is downloadable from a server. The names of components of the program module 1810 according to the embodiment may be modifiable depending on kinds of operating systems.

According to various embodiments, at least a portion of the program module 1810 may be implemented by software, firmware, hardware, or a combination of two or more thereof. At least a portion of the program module 1810 may be implemented (e.g., executed), for example, by the processor (e.g., the processor 1710). At least a portion of the program module 1810 may include, for example, modules, programs, routines, sets of instructions, processes, or the like for performing one or more functions.

The term "module" used in the present disclosure may refer, for example, to a unit including one or more combinations of hardware, software and/or firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include, for example, and without limitation, at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a non-transitory computer-readable storage media in the form of a program module. The instruction, when executed by a processor (e.g., the processor 1620), may cause the one or more processors to perform a function corresponding to the instruction. The computer-readable storage media, for example, may be the memory.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been illustrated and described with reference to various embodiments thereof, it will be understood by those skilled in the art that various changes in form and details may be made therein without departing from the spirit and scope of the present disclosure as defined, for example, by the appended claims and their equivalents.

What is claimed is:

1. A wearable electronic device comprising:

a housing comprising a metal structure comprising metal inclusive material;

a display positioned within the housing, the display including a metal inclusive layer positioned within the metal structure and spaced apart from the metal structure by at least a gap;

a printed circuit board (PCB) positioned within the housing and including a ground region and a control circuit configured to feed a first point of the metal structure; and at least one conductive connection member, comprising a conductive material, electrically connected with a third point of the metal structure;

wherein the metal inclusive layer is electrically connected with the ground region of the PCB at a second point spaced apart from the first point by a given angle, wherein at least a portion of the at least one conductive connection member is configured to couple with the ground region of the PCB.

2. The wearable electronic device of claim 1, further comprising:

a bracket interposed between the display and the PCB within the housing, wherein the at least one conductive connection member includes:

a first C-clip being in contact with the third point of the metal structure and the bracket; and a second C-clip being in contact with the first C-clip and a surface of the PCB.

3. The wearable electronic device of claim 1, wherein at least a partial region of the PCB includes:

a first layer including at least a portion of a non-conductive material; and a second layer including a portion of the ground region, wherein the at least a portion of the at least one conductive connection member is coupled with the portion of the ground region included in the second layer by making contact with at least a portion of a non-conductive material region of the first layer.

4. The wearable electronic device of claim 1, wherein the PCB includes:

a first region comprising a dielectric; and a second region including a ground region, wherein the at least a portion of the at least one conductive connection member is in contact with the first region, and wherein the at least a portion of the at least one conductive connection member and the ground region of the second region are electrically connected through a capacitor.

5. The wearable electronic device of claim 1, wherein the control circuit is configured to:

receive a GPS signal through a first electrical path formed by the metal structure and the metal inclusive layer, and receive a Bluetooth signal through a second electrical path formed by the metal structure and the at least one conductive connection member.

6. A wearable electronic device comprising:

a housing including an upper surface, a lower surface, and a side surface surrounding a space between the upper surface and the lower surface, wherein the side surface includes a ring-shaped member which is ring-shaped, when viewed from above the upper surface, and comprises a conductive material;

a binding structure connected to the housing and configured to be removably mountable on a portion of a body of a user;

a display disposed within the space and exposed through the upper surface and including a first ground plane substantially parallel to the upper surface;

a printed circuit board interposed between the display and the lower surface and including a second ground plane;

a wireless communication circuit positioned on the printed circuit board and electrically connected to a first point positioned at the ring-shaped member;

a first conductive path electrically connected between a second point positioned at an edge of the first ground plane and the second ground plane;

a second conductive path electrically connected between a third point positioned at the ring-shaped member and the second ground plane; and a processor positioned within the space and electrically connected to the display and the communication circuit, wherein, when viewed from above the upper surface, a first imaginary line extending from the center of the upper surface to the first point is substantially at right angles to a second imaginary line extending from the center of the upper surface to the second point, and wherein the second conductive path includes at least one conductive connection member positioned to be coupled with the second ground plane.

7. The wearable electronic device of claim 6, wherein the wireless communication circuit is configured to receive a GPS signal and a Bluetooth signal.

8. The wearable electronic device of claim 6, wherein the second conductive path includes a capacitor.

9. A wearable electronic device comprising:

a housing comprising a metal structure comprising metal inclusive material;

a display positioned within the housing, the display including a metal inclusive layer positioned within the metal structure;

a printed circuit board (PCB) positioned within the housing and including a ground region; and a control circuit disposed on the PCB, the control circuit configured to supply power to a first point of the metal structure, wherein the metal inclusive layer is electrically connected with the ground region of the PCB, wherein a second point of the metal structure is capacitively coupled with the ground region of the PCB, the second point is spaced apart from the first point of the metal structure.

10. The wearable electronic device of claim 9, further comprises: at least one first connection member includes a first capacitor, wherein the at least one first connection member is capacitively coupled to the ground region of the PCB through the first capacitor.

11. The wearable electronic device of claim 10, wherein the first capacitor is disposed on a non-conductive region of the PCB.

12. The wearable electronic device of claim 10, further comprises:

a gap formed between the ground region of the PCB and the at least one first connection member, wherein the at least one first connection member is capacitively coupled to the ground region of the PCB through the gap.

13. The wearable electronic device of claim 12, wherein the at least one first connection member includes a C-clip.

14. The wearable electronic device of claim 13, wherein a virtual coupling capacitor forms between the C-clip and the ground region of the PCB.

15. The wearable electronic device of claim 10, further comprises:

at least one second connection member including a conductive material, the at least one second connection member electrically connected with a third point of the metal structure;

wherein the first point of the metal structure is between the second point and the third point.

16. The wearable electronic device of claim 15, wherein the at least one second connection member is electrically connected to the ground region of the PCB directly.

17. The wearable electronic device of claim 15, wherein the at least one second connection member is capacitively connected to the ground region of the PCB through a non-conductive region of the PCB.

18. The wearable electronic device of claim 9, wherein the control circuit is configured to receive a GPS signal and a Bluetooth signal by using the metal structure.

19. A wearable electronic device comprising:

a housing comprising a metal structure, comprising metal inclusive material, having a closed loop shape;

a display including a metal inclusive layer positioned within the metal structure;

a printed circuit board (PCB) disposed under the display within the housing, the PCB including a ground region; and a control circuit disposed on the PCB, the control circuit configured to supply power to a first point of the metal structure;

wherein the metal inclusive layer is electrically connected with the ground region of the PCB;

wherein a second point of the metal structure is electrically connected with the ground region of the PCB, the second point is spaced apart from the first point of the metal structure.

20. The wearable electronic device of claim 19, wherein the control circuit is configured to receive a GPS signal and a Bluetooth signal by using the metal structure.

* * * * *